United States Patent
Park et al.

(10) Patent No.: US 9,927,659 B2
(45) Date of Patent: Mar. 27, 2018

(54) LIQUID CRYSTAL DISPLAY

(71) Applicant: Samsung Display Co., Ltd., Yongin, Gyeonggi-Do (KR)

(72) Inventors: Eun-Kil Park, Cheonan-si (KR); Wan-Soon Im, Cheonan-si (KR); Yong Woo Hyung, Hwaseong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 30 days.

(21) Appl. No.: 14/060,906

(22) Filed: Oct. 23, 2013

(65) Prior Publication Data

US 2015/0015822 A1 Jan. 15, 2015

(30) Foreign Application Priority Data

Jul. 12, 2013 (KR) ........................ 10-2013-0082385

(51) Int. Cl.
*G02F 1/1337* (2006.01)
*G02F 1/1362* (2006.01)
*G02F 1/1343* (2006.01)

(52) U.S. Cl.
CPC .... *G02F 1/133707* (2013.01); *G02F 1/13624* (2013.01); *G02F 1/136286* (2013.01); *G02F 2001/134345* (2013.01)

(58) Field of Classification Search
CPC ......... G02F 1/133707; G02F 1/136286; G02F 1/13624; G02F 2001/134345; G02F 1/13439; G02F 1/1362; G02F 1/136227; G02F 1/1365; G02F 1/1368; G02F 2001/136218; G02F 2001/136222; G02F 2001/136231; G02F 2001/13625; G02F 2001/1635; G02F 2201/122; G02F 2202/10; G02F 1/1343; G02F 1/134309; G02F 1/155; G02F 1/1393; G02F 1/1395; G02F 1/136; G02F 1/218; G02F 1/134363; G02F 1/134327; G02F 1/134336; G02F 1/0316;
(Continued)

(56) References Cited

U.S. PATENT DOCUMENTS 6,577,366 B1 * 6/2003 Kim .................. G02F 1/133707
349/139
6,747,712 B2 6/2004 Noh et al.
(Continued)

FOREIGN PATENT DOCUMENTS

KR 1020000060432 A 10/2000
KR 100336888 B1 5/2002
(Continued)

*Primary Examiner* — Edward Glick
*Assistant Examiner* — Shan Liu
(74) *Attorney, Agent, or Firm* — Cantor Colburn LLP

(57) ABSTRACT

A liquid crystal display includes a plurality of pixels, a lower substrate and an upper substrate facing each other, a liquid crystal layer disposed between the lower substrate and the upper substrate, a pixel electrode disposed on the lower substrate and including a plurality of sub-regions which differently controls an inclination direction of liquid crystal molecules included in the liquid crystal layer for a pixel of the plurality of pixels, and a gate line disposed on the lower substrate and including a portion which overlaps a boundary between adjacent sub-regions of the plurality of sub-regions of the pixel electrode.

13 Claims, 18 Drawing Sheets

(58) Field of Classification Search
CPC ........ G02F 2001/134318; G02F 2001/134372;
G02F 2001/134381; G02F 2001/1357;
G02F 2001/136295; G02F 2001/1552;
G02F 2001/1555; G02F 2001/1557; G02F
2001/13629; G02F 2201/12; G02F
2201/121; G02F 2201/124; G02F
2201/123; G02F 2201/14; G02F
1/133753; G02F 1/3775; G02F
2001/13787; G02F 2001/3548; G02F
1/136209; H01L 2021/775; H01L
27/1214; H01L 27/2436; H01L 29/66037;
H01L 29/66068; H01L 29/66227; H01L
29/72; H01L 29/786; H01L 2924/1304;
H01L 51/0504; H01L 51/0508; H01L
27/124; H01L 27/3276; H01L 27/3297;
H01L 27/3279; H01L 27/329; H01L
23/49534; H01L 2933/0016; G09G
2300/0421; G09G 2300/0426; G09G
2300/0439; G09G 3/3659
USPC ............................ 349/42–43, 139–148, 129
See application file for complete search history.

(56) References Cited

U.S. PATENT DOCUMENTS

| | | | |
|---|---|---|---|
| 7,342,629 B2* | 3/2008 | Yoshida et al. | 349/130 |
| 7,804,569 B2 | 9/2010 | Sohn et al. | |
| 7,859,629 B2 | 12/2010 | Yoon | |
| 7,894,006 B2 | 2/2011 | Choi et al. | |
| 7,973,899 B2 | 7/2011 | Kim et al. | |
| 8,018,566 B2 | 9/2011 | Yoon | |
| 8,304,769 B2 | 11/2012 | Tsubata et al. | |
| 8,330,917 B2 | 12/2012 | Park et al. | |
| 2002/0180920 A1* | 12/2002 | Noh | G02F 1/134363 349/141 |
| 2003/0193625 A1* | 10/2003 | Yoshida | G02F 1/1393 349/43 |
| 2006/0038946 A1* | 2/2006 | Yoshida | G02F 1/133555 349/114 |
| 2006/0146242 A1* | 7/2006 | Kim et al. | 349/129 |
| 2008/0024710 A1* | 1/2008 | Moon | G02F 1/133707 349/141 |
| 2008/0117373 A1* | 5/2008 | Sohn | G02F 1/134309 349/143 |
| 2009/0027582 A1* | 1/2009 | Ohta et al. | 349/54 |
| 2009/0033608 A1* | 2/2009 | Kim | 345/92 |
| 2010/0123841 A1* | 5/2010 | Shin | 349/38 |
| 2010/0328558 A1* | 12/2010 | Asada | G02F 1/133707 348/792 |
| 2011/0075087 A1* | 3/2011 | Morinaga et al. | 349/143 |
| 2011/0149224 A1* | 6/2011 | Tseng | G02F 1/134309 349/142 |
| 2012/0154703 A1* | 6/2012 | Yoshida | G02F 1/134309 349/43 |
| 2012/0182509 A1* | 7/2012 | Takano et al. | 349/123 |
| 2012/0281172 A1* | 11/2012 | Park et al. | 349/123 |
| 2012/0307172 A1* | 12/2012 | Yoshida | G02F 1/133707 349/43 |
| 2013/0057795 A1 | 3/2013 | Kesho et al. | |

FOREIGN PATENT DOCUMENTS

| | | |
|---|---|---|
| KR | 100375737 B1 | 2/2003 |
| KR | 1020040013495 A | 2/2004 |
| KR | 100483527 B1 | 8/2005 |
| KR | 100697364 B1 | 3/2007 |
| KR | 100701068 B1 | 3/2007 |
| KR | 1020080038538 A | 5/2008 |
| KR | 100865838 B1 | 10/2008 |
| KR | 1020090131596 A | 12/2009 |

* cited by examiner

LIQUID CRYSTAL DISPLAY

This application claims priority to Korean Patent Application No. 10-2013-0082385, filed on Jul. 12, 2013, and all the benefits accruing therefrom under 35 U.S.C. § 119, the entire contents of which are incorporated herein by reference.

BACKGROUND (1) Field

The invention relates to a liquid crystal display.

(2) Description of the Related Art

A liquid crystal display ("LCD"), which is one of the flat panel displays most widely used, typically includes two display panels on which field generating electrodes such as a pixel electrode and a common electrode are formed and a liquid crystal layer inserted therebetween, and displays an image by generating an electric field in the liquid crystal layer by applying a voltage to the field generating electrodes. The electric field determines alignments of liquid crystal molecules of the liquid crystal layer through the electric field, thereby controlling polarization of incident light.

The LCD typically includes a switching element connected to each pixel electrode, a plurality of signal lines such as gate lines and data lines for applying a voltage to a pixel electrode by controlling the switching element and a driver for driving the display panel by applying a driving signal to the signal line.

The driver typically includes a gate driver for supplying a gate signal including a gate on voltage and a gate off voltage to the gate line of the display panel, a data driver for supplying a data signal to the data line of the display panel and a signal controller for controlling the data driver and the gate driver.

An LCD in a vertically aligned ("VA") mode, in which, in a state where an electric field is not applied, longer axes of the liquid crystal molecules are vertically arranged with respect to the upper and lower display panels, among the LCDs has a high contrast ratio and easily implement a wide reference viewing angle, thereby getting the spotlight.

In the LCD in the vertically aligned mode, in order to implement a wide viewing angle, a plurality of domains having different alignment directions of the liquid crystals may be formed at one pixel.

A means for forming the plurality of domains as described above includes a method of defining a cutout such as a slit, for example, at the field generating electrode. According to the method, the liquid crystals are re-arranged by fringe fields formed between an edge of the cutout and the field generating electrode facing the edge of the cutout, so that the plurality of domains may be formed.

The LCD including a domain forming means includes a vertical alignment mode LCD in which the domain forming means are formed on both the upper and lower substrates, and a patternless VA mode LCD in which a micropattern is formed only on the lower substrate, and a pattern is not formed on the upper substrate, for example. A display area is divided into a plurality of domains by the domain forming means, and liquid crystals within each domain substantially incline in the same direction.

SUMMARY

The invention has been made in an effort to provide a liquid crystal display ("LCD") capable of effectively preventing a defect such as light leakage between pixels due to an electric field by a gate signal.

Further, the invention has been made in an effort to improve transmittance and an aperture ratio of an LCD.

An exemplary embodiment of the invention provides an LCD including a lower substrate and an upper substrate facing each other, a liquid crystal layer disposed between the lower substrate and the upper substrate, a pixel electrode disposed on the lower substrate and including a plurality of sub-regions differently controlling an inclination direction of liquid crystal molecules included in the liquid crystal layer for one pixel and a gate line disposed on the lower substrate and including a portion that extends overlapping a boundary between adjacent sub-regions of the pixel electrode.

The pixel electrode may include a first stem portion forming the boundary between the adjacent sub-regions, and the gate line may include a portion that extends overlapping the first stem portion.

The pixel electrode may include a second stem portion substantially vertically connected to the first stem portion, and a plurality of minute branches extending in different directions in different sub-regions.

The LCD may further include a data line configured to transmit a data voltage, a thin film transistor ("TFT") configured to apply the data voltage to the pixel electrode, and a storage electrode line configured to transmit a common voltage, in which the TFT includes a gate electrode connected with the gate line, and a source electrode and a drain electrode facing each other on the gate electrode, and the storage electrode line includes a portion overlapping the pixel electrode or the drain electrode.

The gate line may include a bent portion bent at an edge portion of the pixel electrode.

The first stem portion may extend in a first direction, and the TFT may be disposed between two pixels neighboring in the first direction.

The pixel electrode the pixel electrode may include a plurality of unit electrodes connected with each other, a unit electrode of the unit electrodes may include the plurality of sub-regions, and the gate line may include a portion that extends overlapping a boundary between the sub-regions of the unit electrode.

The LCD may further include an opposing electrode disposed on the upper substrate, in which the opposing electrode includes an opening facing and extending parallel to at least one of the first stem portion and the second stem portion.

A length of the first stem portion may be longer than a length of the second stem portion.

A length of the second stem portion may be longer than a length of the first stem portion.

The pixel electrode may include a first sub-pixel electrode and a second sub-pixel electrode adjacent to each other with a gap defined therebetween, and the gate line may include a portion that extends overlapping the gap.

One of the first sub-pixel electrode and the second sub-pixel electrode may include a plurality of unit electrodes connected with each other.

A unit electrode of the unit electrodes may include the plurality of sub-regions, and the unit electrode may include a plurality of minute branches extending in different direction in different sub-regions.

A first cutout providing a boundary between the sub-regions may be defined in the pixel electrode.

The LCD may further include an opposing electrode disposed on the upper substrate, and a second cutout extending substantially parallel to the first cutout and providing a boundary between the sub-regions may be defined in the opposing electrode.

The LCD may further include a vertical alignment layer disposed on an inner surface of one of the lower substrate and the upper substrate.

BRIEF DESCRIPTION OF THE DRAWINGS

The above and other aspects, advantages and features of this disclosure will become more apparent by describing in further detail exemplary embodiments thereof with reference to the accompanying drawings, in which.

DETAILED DESCRIPTION

Figure 1:
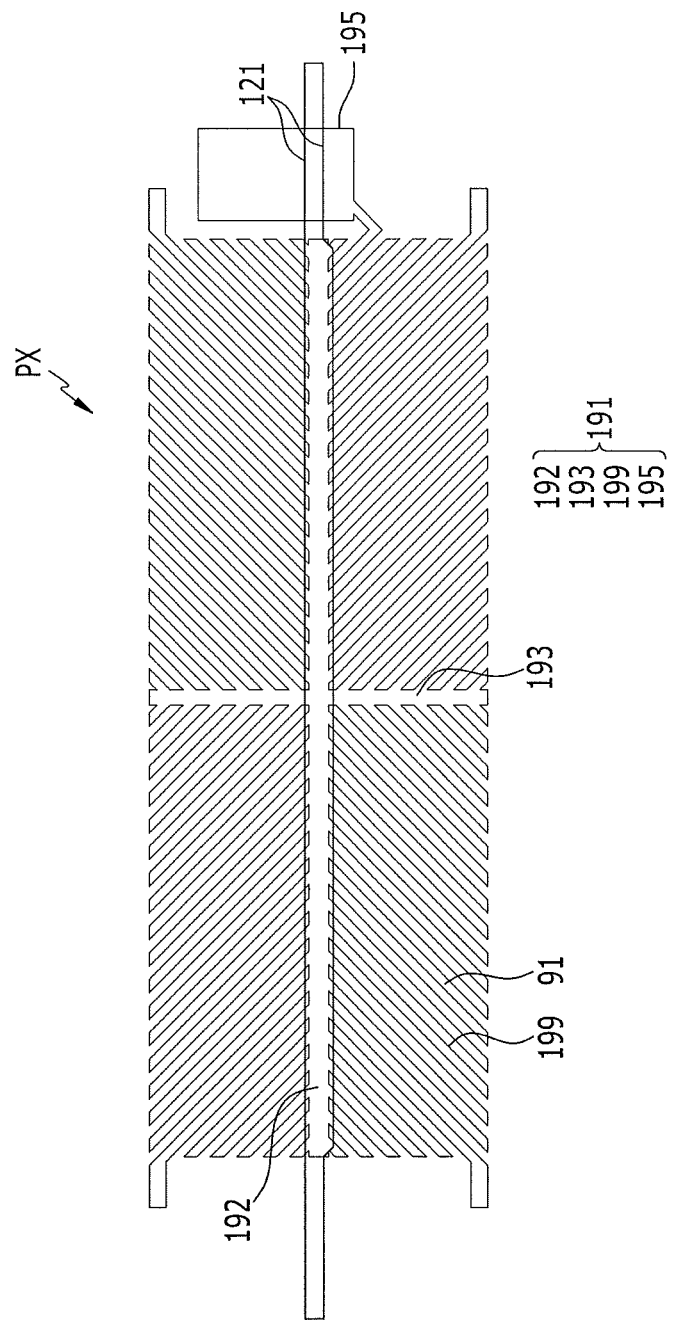
FIG. 1 is a top plan view illustrating an exemplary embodiment of a pixel electrode and gate lines for one pixel of a liquid crystal display ("LCD") according to the invention.

According to exemplary embodiments of the invention, it is possible to effectively prevent a defect such as light leakage between pixels due to an electric field by a gate signal, and improve transmittance and an aperture ratio of a liquid crystal display ("LCD").

The invention will be described more fully hereinafter with reference to the accompanying drawings, in which exemplary embodiments of the invention are shown. As those skilled in the art would realize, the described exemplary embodiments may be modified in various different ways, all without departing from the spirit or scope of the invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, exemplary embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

First, an LCD according to an exemplary embodiment of the invention will be described with reference to FIG. 1.

FIG. 1 is a top plan view illustrating a pixel electrode and gate lines for one pixel of an LCD according to an exemplary embodiment of the invention.

Referring to FIG. 1, the LCD according to the exemplary embodiment of the invention includes a liquid crystal panel assembly (not illustrated), a gate driver (not illustrated) and a data driver (not illustrated) for driving the liquid crystal panel assembly.

The liquid crystal panel assembly includes a plurality of signal lines, and a plurality of pixels PX connected to the plurality of signal lines and arranged in a form of a matrix. The liquid crystal panel assembly includes a lower display panel (not illustrated) and an upper display panel (not illustrated), which face each other, and a liquid crystal layer (not illustrated) interposed between the two display panels. Alignment layers (not illustrated) may be disposed on inner surfaces of the two display panels, and may be vertical alignment layers. Further, a polarizer (not illustrated) is provided at an external surface of at least one of the two display panels, and polarization axes of the two polarizers may be substantially perpendicular to each other.

The signal lines include a plurality of gate lines 121 for transmitting gate signals (also referred to as "scan signals") and a plurality of data lines (not illustrated) for transmitting a data voltage. The gate lines 121 may be extended substantially in a row direction and may be substantially parallel to each other, and the data lines may be extended in a column direction and may be substantially parallel to each other.

Each pixel PX includes a liquid crystal capacitor (not illustrated) and a switching element (not illustrated) connected with the liquid crystal capacitor. In an exemplary embodiment, the switching element may be a three-terminal element of a thin film transistor ("TFT"), for example, and the like. A control terminal of the switching element is connected with the gate lines 121, an input terminal thereof may be connected with the data line, and an output terminal thereof may be directly/indirectly connected with the liquid crystal capacitor.

Two electrodes of the liquid crystal capacitor, for example, a pixel electrode 191 of the lower display panel and an opposing electrode (not illustrated) of the upper display panel, may serve as the two terminals, and the liquid crystal layer between the two electrodes serves as a dielectric material.

Each pixel PX may further include a storage capacitor (not illustrated) playing an auxiliary role of the liquid crystal capacitor.

Referring to FIG. 1, the pixel electrode 191 according to the exemplary embodiment of the invention includes a cross-shaped branch portion including a horizontal stem portion 192 and a vertical stem portion 193 perpendicular to the horizontal stem portion 192. The pixel electrode 191 is divided into four sub-regions by the horizontal stem portion 192 and the vertical stem portion 193. That is, the horizontal stem portion 192 and the vertical stem portion 193 provide a border between adjacent sub-regions.

The pixel electrode 191 may further include a plurality of minute branches 199 disposed at each sub-region. The minute branches 199 may be obliquely extended to an outside from the horizontal stem portion 192 or the vertical stem portion 193. The minute branches 199 of different sub-regions of one pixel electrode 191 may extend in different directions from each other. Particularly, the minute branches 199 of adjacent two sub-regions may provide an angle of approximately 90 degrees or approximately 180 degrees therebetween. Directions in which the minute branches 199 are extended in the respective sub-regions may be uniform.

Micro slits 91, in which material of an electrode is omitted, are disposed between and/or defined by adjacent minute branches 199.

In an exemplary embodiment, pitches of the minute branches 199 and the micro slits 91 may be approximately 5 micrometers (μm) to approximately 8 μm, but are not limited thereto. In an exemplary embodiment, a ratio of a width of the minute branch 199 to a width of the micro slit 91 may be approximately 1.5:1 to approximately 1:1.5, but is not limited, and may be appropriately adjusted considering a display characteristic. The pitch and the width may be taken in a direction perpendicular to an elongation direction of the minute branch 199.

In an exemplary embodiment, an acute angle between the minute branch 199 and the horizontal stem portion 192 may be approximately 40 degrees to approximately 45 degrees, but is not limited thereto, and may be appropriately adjusted considering a display characteristic such as visibility of the LCD, for example.

According to the exemplary embodiment of the invention, the horizontal branch portions 192 of the pixel electrode 191 and the gate lines 121 disposed at different layers may be overlapping each other. A width of the horizontal stem portion 192 of the pixel electrode 191 may be larger than or equal to, or smaller than a width of the gate line 121.

An entire shape of the pixel electrode 191 may be a quadrangle. In FIG. 1, the pixel electrode 191 elongating in a horizontal direction is illustrated as an exemplary embodiment, but the invention is not limited thereto, and a length of the pixel electrode 191 in a vertical direction may also be longer than a length of the pixel electrode 191 in the horizontal direction.

The pixel electrode 191 may further include a protrusion 195 for a connection with another layer.

In order to implement a display of colors, each pixel PX uniquely displays one of the primary colors (spatial division), or each pixel PX alternately displays the primary colors according to a time (temporal division), so that a desired color is recognized through a spatial or temporal sum of the primary colors. In an exemplary embodiment, the primary colors include three primary colors such as a red color, a green color and a blue color, for example. In the spatial division, each pixel PX may include a color filter (not illustrated) representing one of the primary colors.

The liquid crystal layer includes liquid crystal molecules (not illustrated) having a dielectric anisotropy. The liquid crystal molecules may have, particularly, negative dielectric anisotropy. The liquid crystal molecules may be aligned so that longer axes thereof are generally vertical to the surfaces of the two display panels in a state where an electric field is not generated in the liquid crystal layer.

The liquid crystal layer disposed at one pixel PX may include a plurality of domains (not illustrated) where inclination directions of the liquid crystal molecules are different from each other when the electric field is generated in the liquid crystal layer to implement a wide viewing angle. The inclination direction of the liquid crystal molecules may be uniform in each domain. The domains of the liquid crystal layer in one pixel PX may correspond to the plurality of sub-regions of the corresponding pixel electrode 191, respectively. In an exemplary embodiment, in a case where the pixel electrode 191 includes four sub-regions, the liquid crystal layer corresponding to the pixel electrode 191 may have four domains corresponding to the sub-regions, respectively, for example.

The liquid crystal molecules of each domain may be initially aligned while having a pretilt in each moving direction in a state where the electric field does not exist in the liquid crystal layer for a fast response speed.

The data driver is connected with the data lines of the liquid crystal panel assembly, and applies the data voltage to the data lines.

The gate driver is connected with the gate lines 121 of the liquid crystal panel assembly, and applies the gate signal including a combination of a gate on voltage through which the switching element is turned on, and a gate off voltage through which the switching element is turned off to the gate lines 121.

Then, an operation of the LCD will be described.

When the switching element is turned on by applying the gate on voltage to the gate electrode of the switching element, the data voltage is applied to the pixel electrode 191. The pixel electrode 191 to which the data voltage is applied and the opposed electrode to which the common voltage is applied together generate an electric field in the liquid crystal layer.

The electric field includes a vertical component having a substantially vertical direction with respect to a surface of the display panel, and the liquid crystal molecules tend to incline in a direction substantially parallel to the surface of the display panel by the vertical component of the electric field. Fringe fields are provided between the edges of the horizontal stem portion 192, the vertical stem portion 193, and the minute branches 199 of the pixel electrode 191 and the opposed electrode, so that the liquid crystal molecules generally incline toward a connecting portion of the horizontal stem portion 192 and the horizontal stem portion 193, and in a direction substantially parallel to the minute branches 199. Accordingly, a plurality of domains having different inclination directions of the liquid crystal molecules from each other is provided in the liquid crystal layer for one pixel PX.

When the gate off voltage is applied to the gate line 121, the switching element is turned off, and the pixel voltage charged in the liquid crystal capacitor is maintained until the switching element is turned on again in a next frame. In this case, the storage capacitor Cst may assist voltage storage performance of the liquid crystal capacitor. According to the related art, the gate lines 121 are generally disposed between the adjacent pixels PX, and when the gate off voltage is applied to the gate lines 121, charges are accumulated at a boundary of the pixels PX due to a large difference of a voltage between the opposing electrode and the gate line 121, and a defect of light leakage may be generated at a boundary of the pixels PX due to the electric field by the accumulated charges.

However, according to the exemplary embodiment of the invention, the gate lines 121 are disposed to overlap the horizontal stem portion 192 providing the boundary between the sub-regions of the pixel electrode 191, so that the electric field by the gate off voltage is fundamentally blocked by the horizontal stem portion 192 of the pixel electrode 191, and the defect of light leakage between the pixels PX is not generated.

Further, contrary to the related art, according to the exemplary embodiment of the invention, the gate lines 121 are not disposed between the adjacent pixels PX so that it is possible to decrease a non-opening region between the adjacent pixels PX, thereby further increasing an aperture ratio of one pixel PX and improving transmittance.

Further, the region corresponding to the horizontal stem portion 192 of the pixel electrode 191 is a boundary between the sub-regions of the pixel electrode 191 and is not a main transmitting region of light so that the gate lines 121 overlap the horizontal stem portion 192 of the pixel electrode 191. Therefore, an aperture ratio and transmittance are not decreased.

Then, the LCD according to the exemplary embodiment of the invention will be described with reference to FIGS. 2 and 3 together with the aforementioned drawing. The same constituent elements as those of the aforementioned exemplary embodiment are indicated by the same reference numerals, and the same description will be omitted, which will be equally applied hereinafter.

Figure 2:
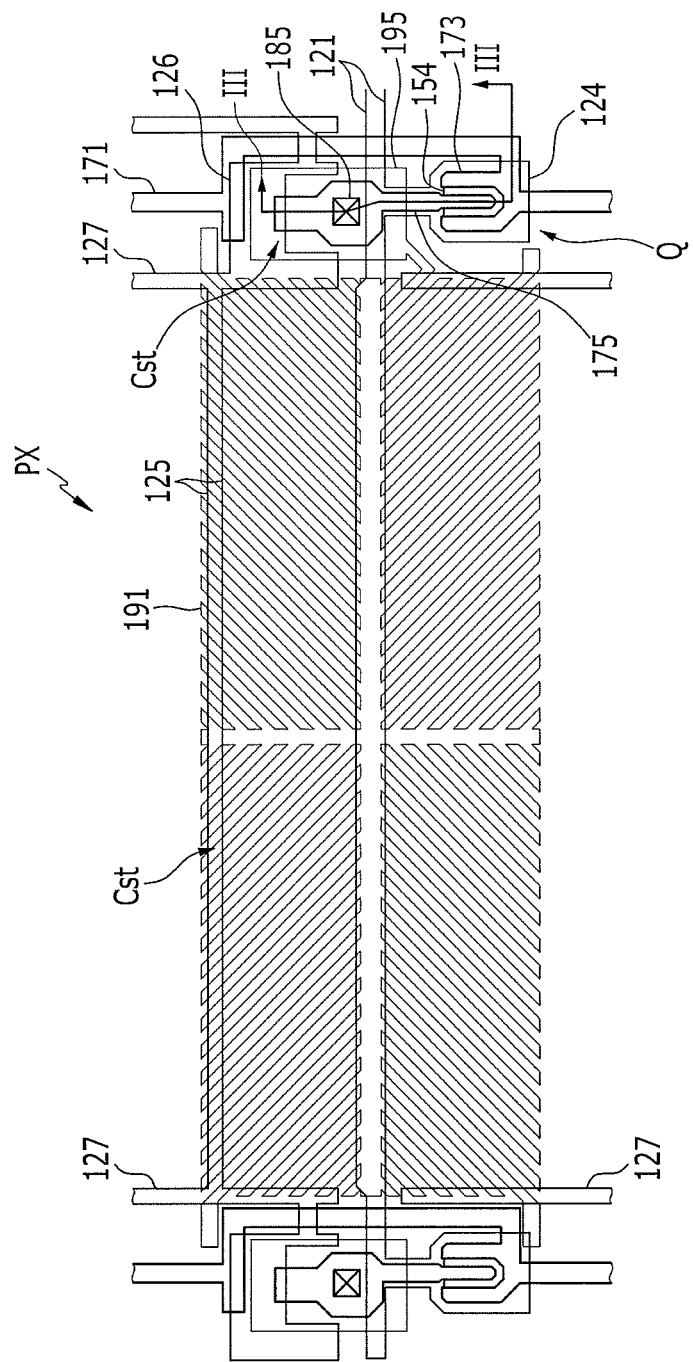
FIG. 2 is a plan view of the exemplary embodiment of one pixel of the LCD according to the invention.
Figure 3:
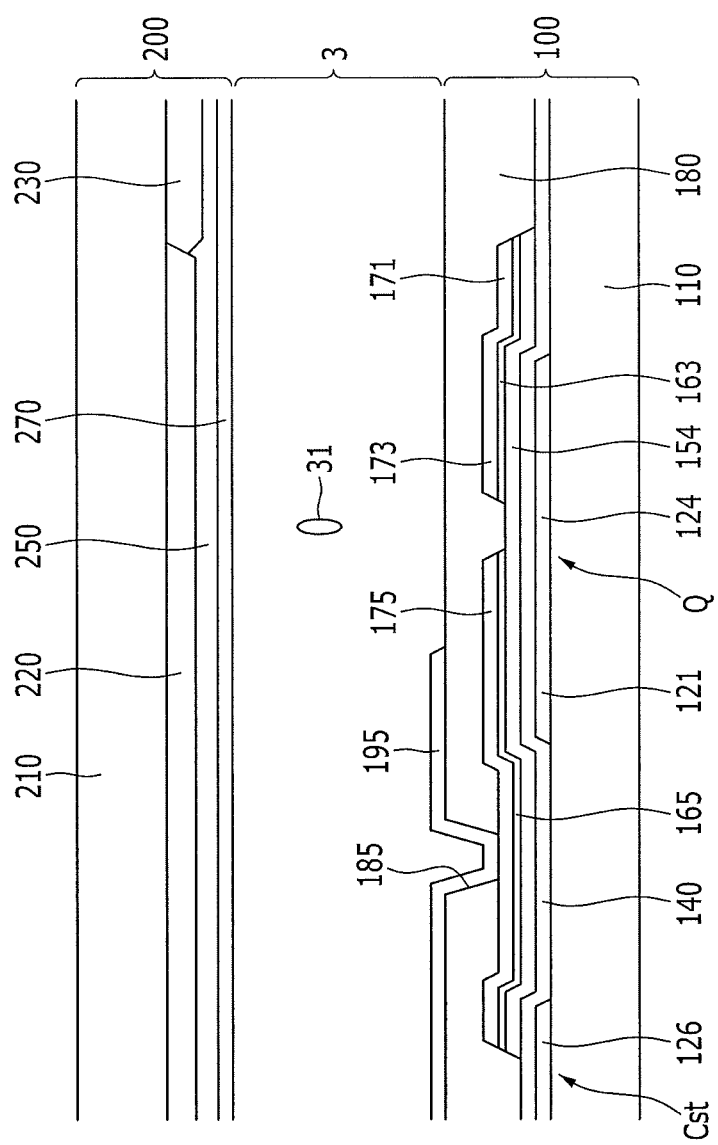
FIG. 3 is a cross-sectional view of the LCD of FIG. 2 taken along line III-III.

FIG. 2 is a plan view of one pixel of the LCD according to the exemplary embodiment of the invention, and FIG. 3 is a cross-sectional view of the LCD of FIG. 2 taken along line III-III.

Referring to FIGS. 2 and 3, the display device according to the exemplary embodiment of the invention includes a lower display panel 100 and an upper display panel 200 facing each other, and a liquid crystal layer 3 interposed between the two display panels 100 and 200.

First, the lower display panel 100 will be described. The gate lines 121 including the gate electrode 124, and storage electrode lines 125 are disposed on an insulating substrate 110.

The gate line 121 transmits a gate signal, and is generally extended in a horizontal direction.

The storage electrode line 125 generally transmits a predetermined voltage, such as a common voltage, in a direction substantially parallel to the gate line 121. In a case where the gate line 121 is extended in the horizontal direction, the storage electrode line 125 may be generally extended in the horizontal direction, for example. The storage electrode line 125 may include a main line extended in substantially parallel to the gate line 121, the plurality of branch portions 127 extended to be substantially vertical to the gate line 121 and a storage electrode 126.

A gate insulating layer 140 is disposed on the gate lines 121 and the storage electrode lines 125, and a semiconductor 154 including hydrogenated amorphous silicon, polysilicon or an oxide semiconductor is disposed on the gate insulating layer 140.

A data line 171 and a drain electrode 175 are disposed on the semiconductor 154 and the gate insulating layer 140.

In an exemplary embodiment, ohmic contact layers 163 and 165 are disposed on the semiconductor 154. The ohmic contact layers 163 and 165 may face opposite to each other.

The data line 171 transmits a data voltage, and is generally extended in a vertical direction to cross the gate line 121. The data line 171 includes a source electrode 173 extended toward the gate electrode 124. The data line 171 may be periodically bent.

The drain electrode 175 is separated from the data line 171, and includes a portion facing the source electrode 173. In an exemplary embodiment, the source electrode 173 and the drain electrode 175 may be disposed on the ohmic contact layers 163 and 165, respectively.

The gate electrode 124, the source electrode 173 and the drain electrode 175 are included in a TFT Q together with the semiconductor 154.

A passivation layer 180 including an insulating material is disposed on the TFT Q. A contact hole 185 through which the drain electrode 175 is exposed is defined in the passivation layer 180.

The pixel electrode 191 is disposed on the passivation layer 180. The pixel electrode 191 may include a transparent conductive material such as indium tin oxide ("ITO") or indium zinc oxide ("IZO"), or a reflective metal such as aluminum, silver, chromium, or an alloy thereof. A detailed structure of the pixel electrode 191 is substantially the same as the aforementioned exemplary embodiment illustrated in FIG. 1, thereby a detailed description thereof will be omitted.

A protrusion 195 of the pixel electrode 191 may be connected to the drain electrode 175 via the contact hole 185. The pixel electrode 191 may receive the data voltage from the drain electrode 175.

Next, the upper display panel 200 will be described. In the upper display panel 200, a color filer 230 and a light blocking member 220 may be disposed on the insulating substrate 210.

The light blocking member 220 may also be referred to as a black matrix, and may effectively prevent light leakage between the pixel electrodes 191. The light blocking member 220 may overlap most of the data line 171, the gate line 121 and the TFT Q.

The color filter 230 may display one of the primary colors such as the three primary colors including a red color, a green color and a blue color. According to another exemplary embodiment of the invention, at least one of the light blocking member 220 and the color filter 230 may be disposed on the lower display panel 100.

An overcoat 250 is disposed on the color filter 230 and the light blocking member 220, and an opposing electrode 270 is disposed on the overcoat 250. The opposing electrode 270 may include a transparent conductor, such as ITO and IZO or a metal. The opposing electrode 270 may receive the common voltage. The opposing electrode 270 are disposed on an entire surface of the insulating substrate 210, and the opposed electrodes 270 of the plurality of pixels PX are connected with each other. A cutout may or may not be defined in the opposing electrode 270.

The liquid crystal layer 3 includes a liquid crystal molecule 31 having negative dielectric anisotropy. The liquid crystal molecule 31 is aligned so that a longer axis thereof is generally vertical to the surfaces of the two display panels 100 and 200 in a state where an electric field is not generated in the liquid crystal layer 3.

The pixel electrode 191 and the opposing electrode 270 provide the liquid crystal capacitor together with the liquid crystal layer 3 part interposed therebetween to maintain the applied voltage even after the TFT Q is turned off. The pixel electrode 191 or the drain electrode 175 overlaps the storage electrode line 125 with the gate insulating layer 140 or the passivation layer 180 interposed therebetween to provide a storage capacitor Cst. The storage electrode line 125 including the storage electrode 126 and the branch portion 127 may mainly overlap the pixel electrode 191 or the drain electrode 175 at an edge portion of the pixel electrode 191.

Next, an LCD according to an exemplary embodiment of the invention will be described with reference to FIGS. 4 to 6 together with the aforementioned drawings.

Figure 4:
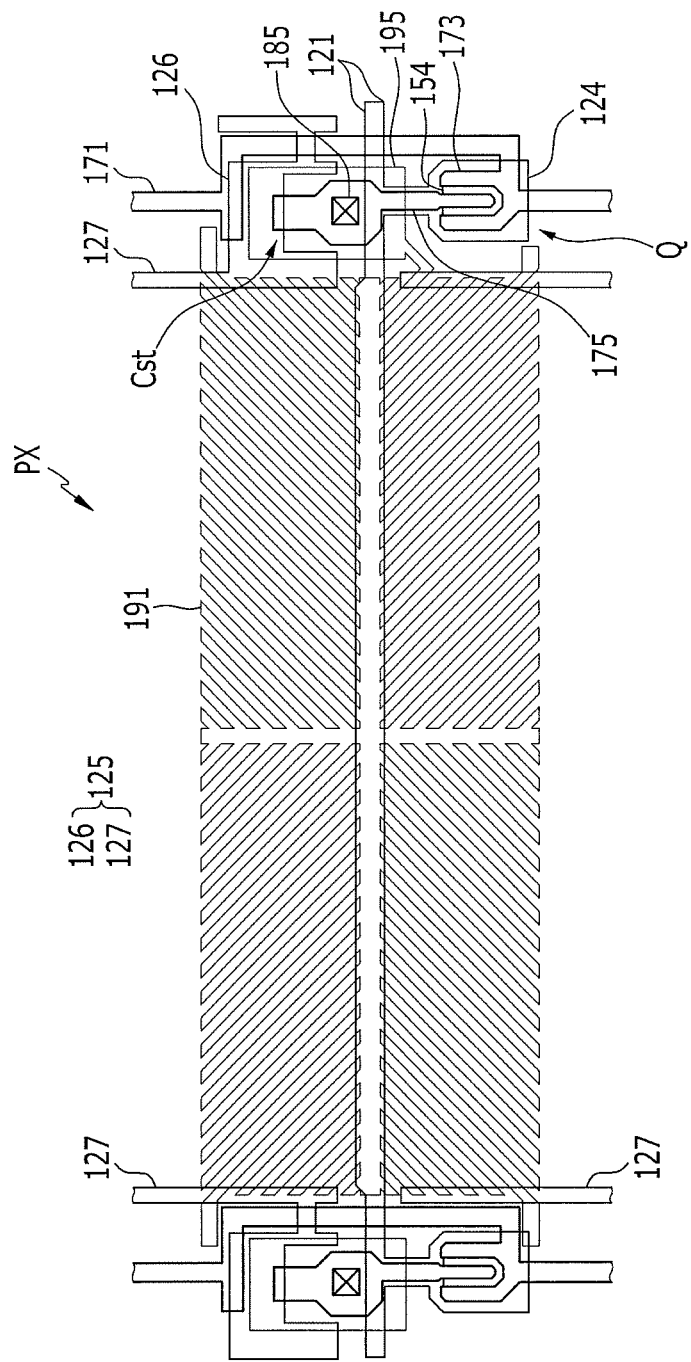
FIGS. 4 to 6 are plan views of exemplary embodiments of one pixel of an LCD according to the invention, respectively.
Figure 5:
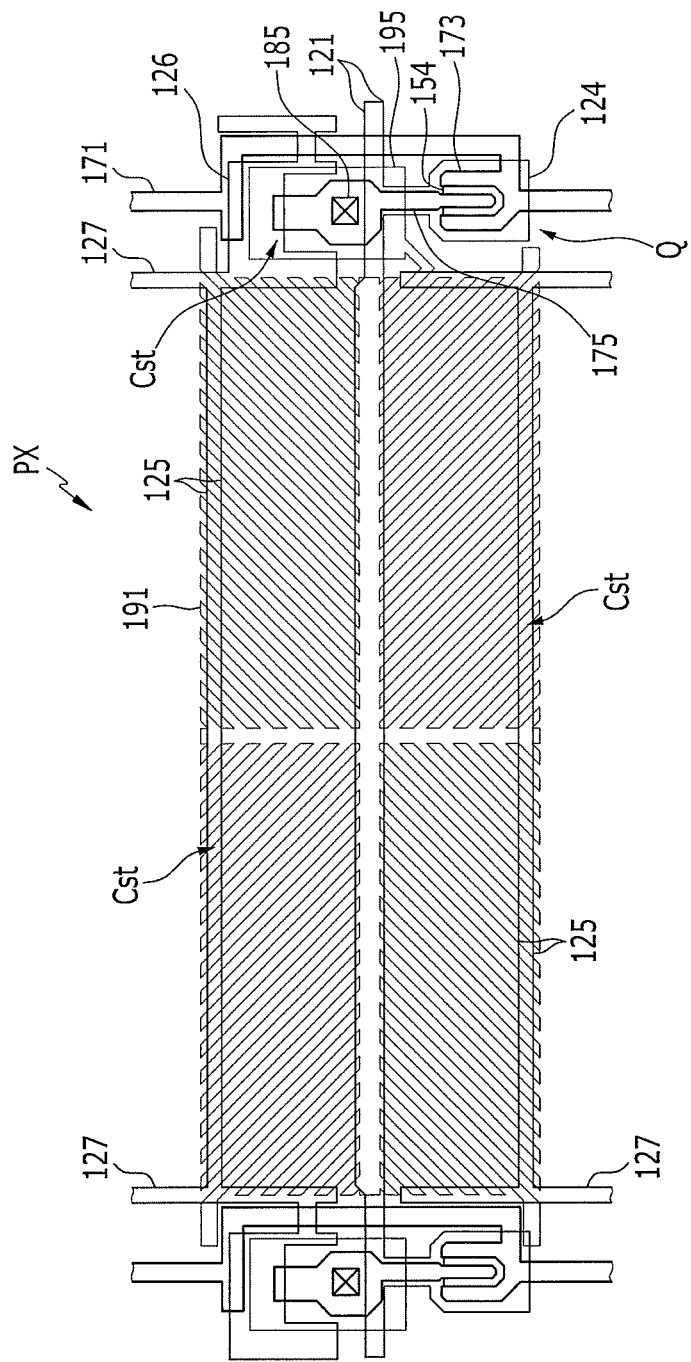
Figure 6:
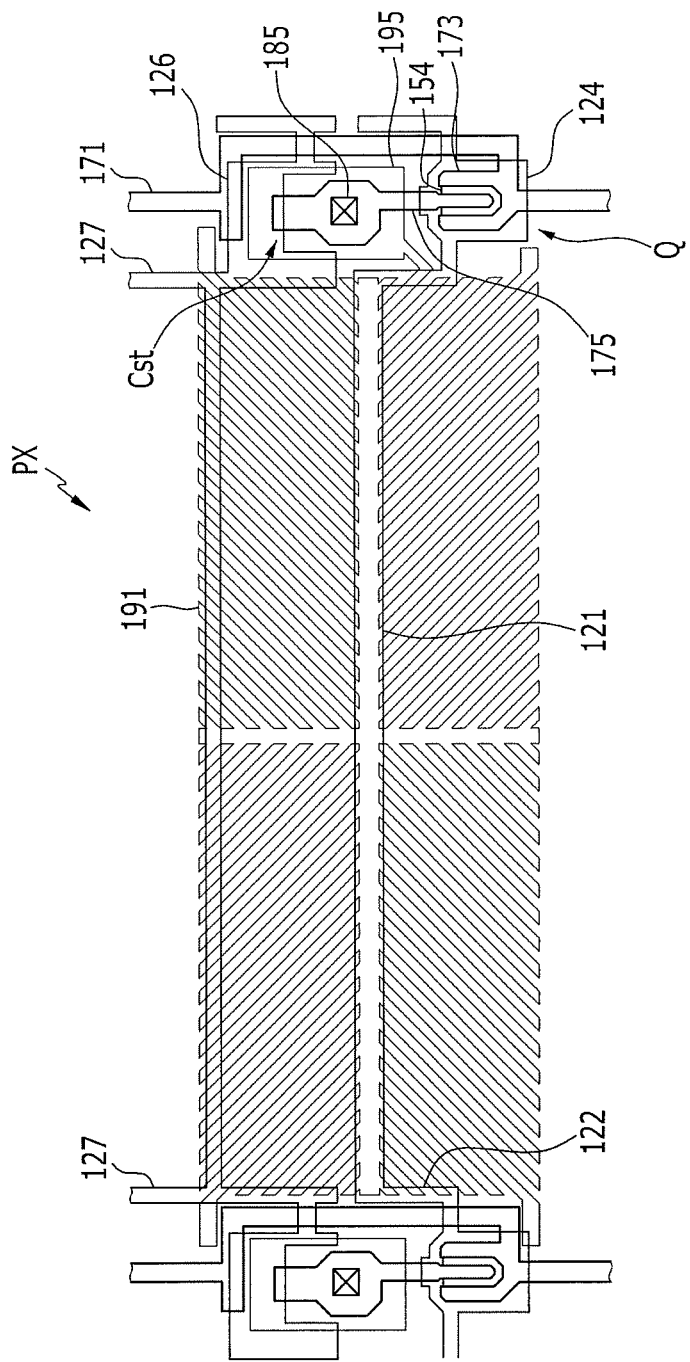

FIGS. 4 to 6 are plan views of one pixel of an LCD s according to exemplary embodiments of the invention, respectively.

First, referring to FIG. 4, the LCD according to the exemplary embodiment is similar to the aforementioned exemplary embodiment illustrated in FIGS. 2 and 3, but a horizontal portion of the storage electrode line 125 may be omitted. Accordingly, the storage electrode line 125 may have a structure connected only in the vertical direction.

Accordingly, capacitance of the storage capacitor Cst may be generally decreased, but it is possible to compensate for decreased capacitance of the storage capacitor Cst by appropriately adjusting parasitic capacitance between the gate electrode 124 and the drain electrode 175 of the TFT Q, or a parasitic capacitance between the gate electrode 124 and the source electrode 173, and minimize an influence by a kickback voltage.

According to the illustrated exemplary embodiment, the horizontal portion of the storage electrode line 125, which is disposed at the opening of the pixel PX in the aforementioned exemplary embodiment in FIGS. 2 and 3, is not present, so that transmittance may be further improved compared to the aforementioned exemplary embodiment illustrated in FIGS. 2 and 3.

Next, referring to FIG. 5, the LCD according to the exemplary embodiment is similar to the aforementioned exemplary embodiment illustrated in FIGS. 2 and 3, but the storage electrode line 125 may include a pair of horizontal portions (denoted by reference numeral "125") overlapping the pixel electrode 191 of one pixel PX to provide a storage capacitor Cst. Accordingly, as illustrated in FIG. 5, the storage capacitor Cst may be disposed along most of the sides of the edge of one pixel PX to maximize capacitance of the storage capacitor Cst, and further effectively reduce a size of a kickback voltage.

Next, referring to FIG. 6, the LCD according to the exemplary embodiment is similar to the aforementioned exemplary embodiment illustrated in FIGS. 2 and 3, but a structure of the gate line 121 may be different.

According to the exemplary embodiment, the gate line 121 may further include a horizontal portion overlapping the horizontal stem portion 192 of the pixel electrode 191, a gate electrode 124 included in the TFT Q, and a bent portion 122 connecting the horizontal portion and the gate electrode 124. The bent portion 122 is bent so as not to overlap the data line 171 and the drain electrode 175 and be as far as possible therefrom, and may be provided to be relatively narrower than other portions of the gate line 121.

According to the exemplary embodiment, an overlapping area between the gate line 121 and the data line 171 or the drain electrode 175 may be decreased so that it is possible to decrease a size of a kickback voltage, and improve a poor image quality such as flicker.

Then, an LCD according to the exemplary embodiment of the invention will be described with reference to FIGS. 7 and 8 together with the aforementioned drawings.

Figure 7:
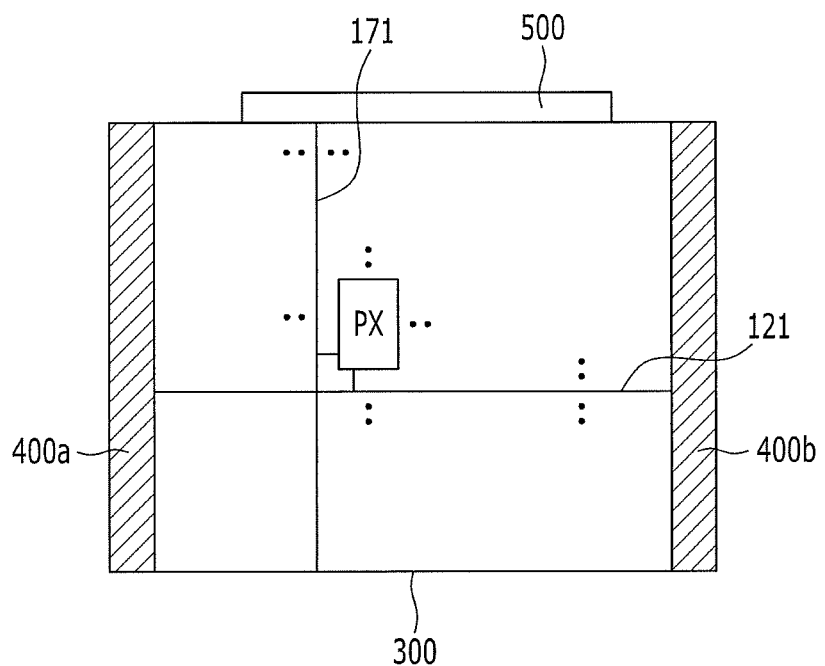
FIGS. 7 and 8 are exemplary embodiments of block diagrams of an LCD according to the invention, respectively.
Figure 8:
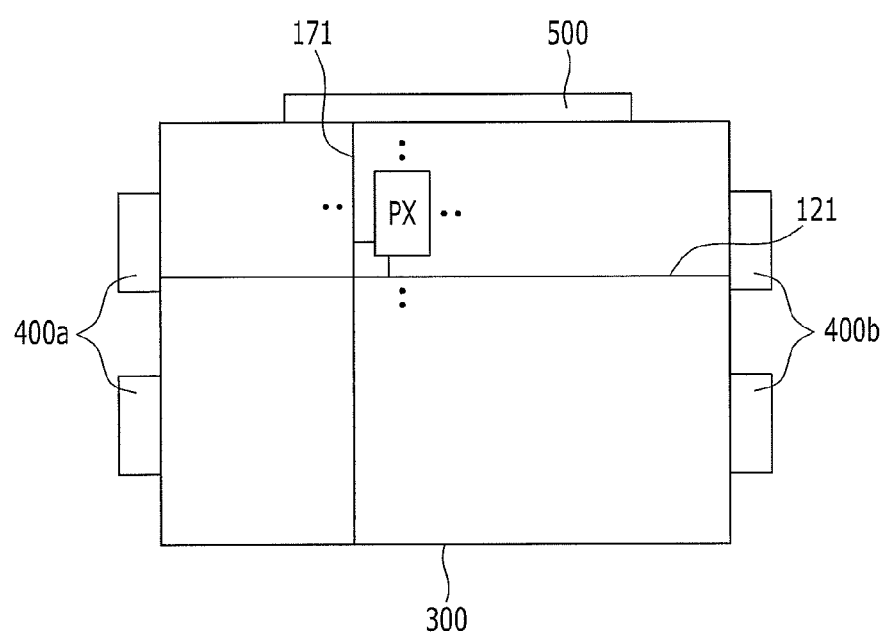

FIGS. 7 and 8 are block diagrams of the LCD according to the exemplary embodiment of the invention, respectively.

First, referring to FIG. 7, the LCD according to the exemplary embodiment of the invention includes a liquid crystal panel assembly 300, gate drivers 400a and 400b and a data driver 500.

The liquid crystal panel assembly 300 includes a plurality of gate lines 121, a plurality of data lines 171 and a plurality of pixels PX connected to the signal lines including the plurality of gate lines 121 and the plurality of data lines 171, and arranged in a matrix form. A structure of the liquid crystal panel assembly 300 is similar to that of the aforementioned exemplary embodiment, thereby a detailed description thereof will be omitted.

The gate drivers 400a and 400b are connected with the gate line 121 of the liquid crystal panel assembly 300, and apply a gate signal including a combination of a gate on voltage through which a switching element is turned on and a gate off voltage through which a switching element is turned off to the gate line 121. The gate drivers 400a and 400b may be disposed at opposing side edges of the liquid crystal panel assembly 300 as illustrated in FIG. 7, respectively. In an exemplary embodiment, the gate driver 400a may be disposed at a left side edge of the liquid crystal panel assembly 300, and the gate driver 400b may be disposed at a right side edge of the liquid crystal panel assembly 300, for example. However, in another exemplary embodiment, one gate driver (not illustrated) may be disposed at one side edge of the liquid crystal panel assembly 300.

Referring to FIG. 7, the gate drivers 400a and 400b may be integrated on the liquid crystal panel assembly 300 together with a TFT Q. However, in another exemplary embodiment, the gate drivers 400a and 400b may be directly mounted on the liquid crystal panel assembly 300 in a form of at least one integrated circuit ("IC") chip, may be mounted on a flexible printed circuit film (not illustrated) and attached to the liquid crystal panel assembly 300 in a form of a tape carrier package ("TCP"), or may be mounted on a separate printed circuit board ("PCB") (not illustrated).

The data driver 500 is connected with the data line 171 of the liquid crystal panel assembly 300, and applies the data voltage to the data line 171. In the illustrated exemplary embodiment, the data driver 500 may be disposed at only one side edge of an upper side or a lower side of the liquid crystal panel assembly 300 as illustrated in FIG. 7, to be connected with the data line 171. However, in another exemplary embodiment, a pair of data drivers (not illustrated) may be disposed at both side edges of the liquid crystal panel assembly 300 that face each other.

The data driver 500 may be directly mounted on the liquid crystal panel assembly 300 in a form of at least one IC chip, or may be mounted on a flexible printed circuit film and attached to the liquid crystal panel assembly 300 in a form of a TCP, or may be mounted on a separate PCB. In another exemplary embodiment, the data driver 500 may also be integrated on the liquid crystal panel assembly 300 together with the TFT Q.

Next, referring to FIG. 8, the exemplary embodiment is similar to the exemplary embodiment illustrated in FIG. 7, but gate drivers 400a and 400b may not be integrated on a liquid crystal panel assembly 300. The gate driver 400a and 400b may be directly mounted on the liquid crystal panel assembly 300 in a form of at least one IC chip, may be mounted on a flexible printed circuit film and attached to the liquid crystal panel assembly 300 in a form of a TCP, or may be mounted on a separate PCB.

Next, an LCD according to an exemplary embodiment of the invention will be described with reference to FIGS. 9 to 11 together with the aforementioned drawings.

Figure 9:
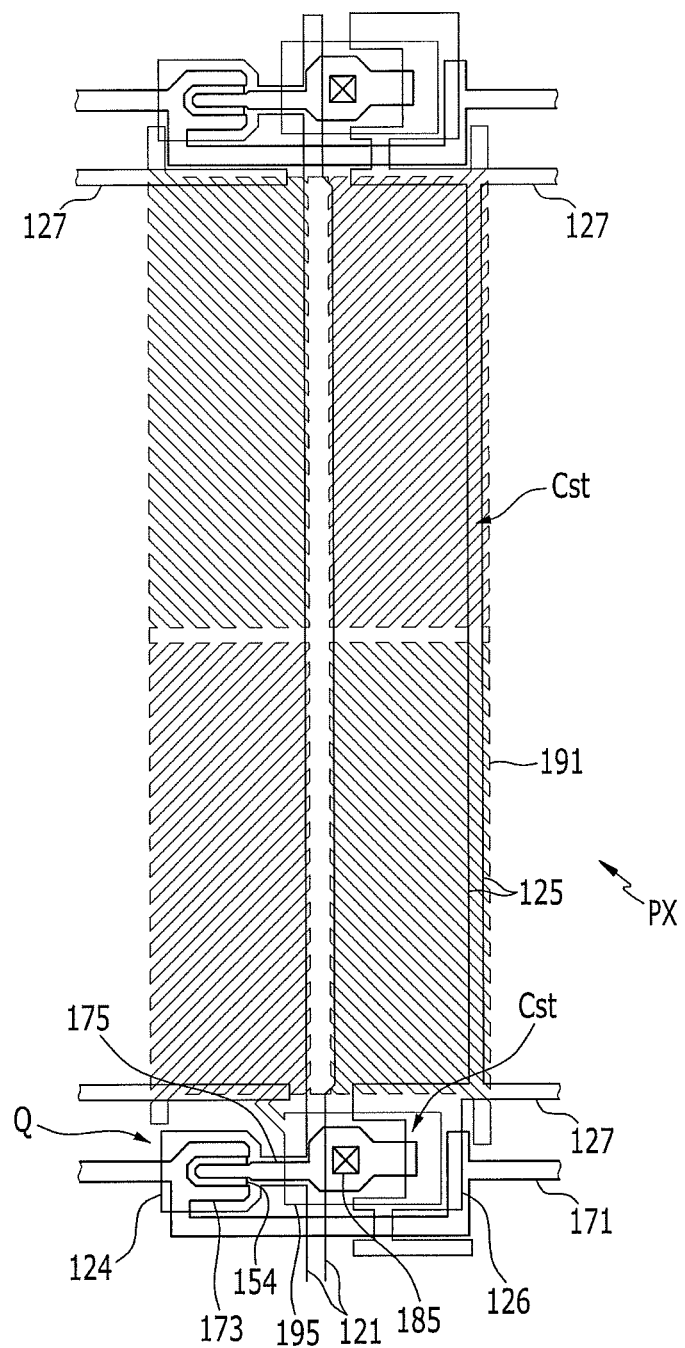
FIG. 9 is a plan view of an exemplary embodiment of one pixel of an LCD according to the invention.
Figure 10:
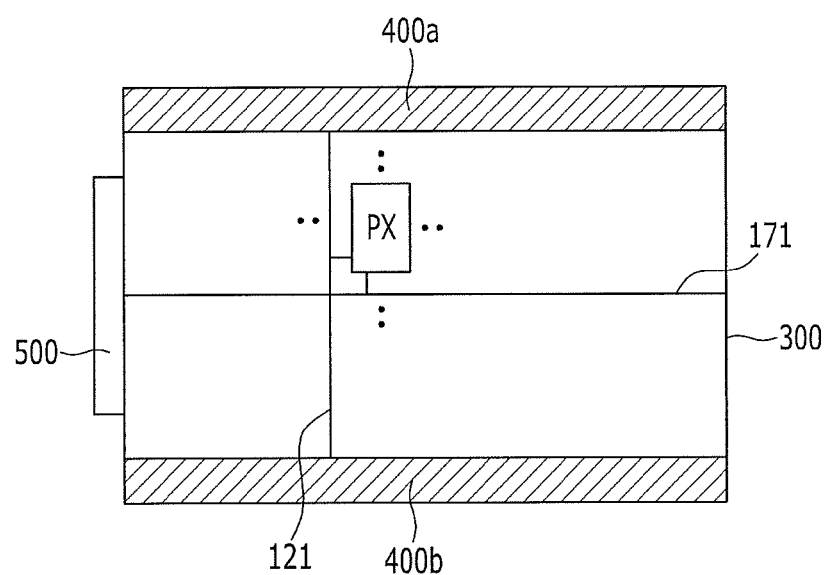
FIGS. 10 and 11 are exemplary embodiments of block diagrams of an LCD according to the invention, respectively.
Figure 11:
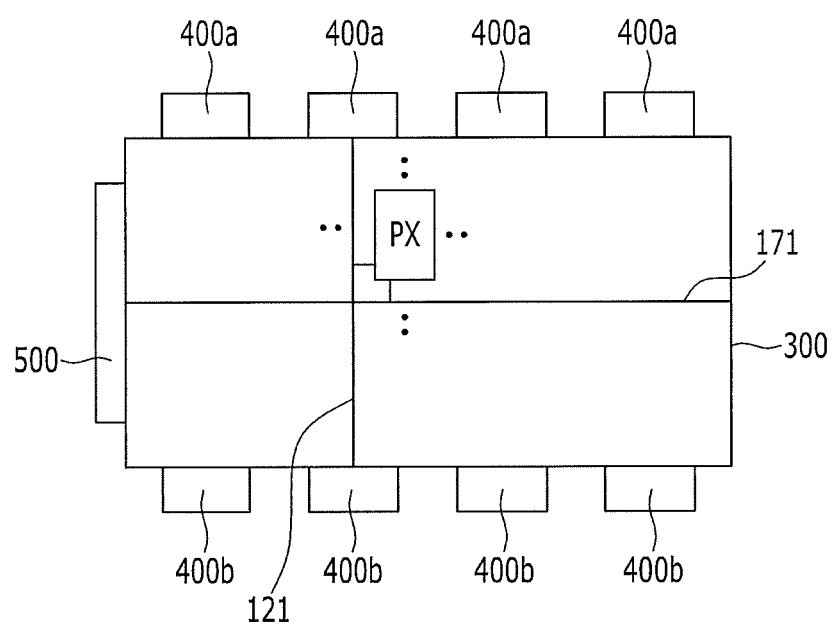

FIG. 9 is a plan view of one pixel of an LCD according to an exemplary embodiment of the invention, and FIGS. 10 and 11 are block diagrams of an LCD according to another exemplary embodiment of the invention, respectively.

Referring to FIG. 9, the LCD according to the exemplary embodiment is similar to that of the aforementioned exemplary embodiments illustrated in FIGS. 2 to 6, but a length of one pixel PX and a pixel electrode 191 in a vertical direction may be longer than a length thereof in a horizontal direction.

According to the exemplary embodiment, gate lines 121 may be vertically extended, and data lines 171 may be horizontally extended. Further, a TFT Q may be disposed between the pixel electrodes 191 adjacent in a vertical direction.

In a case where the pixel PX has the same structure as that of the exemplary embodiment illustrated in FIG. 9, positions of a gate driver and a data driver may be different from those in previously described FIGS. 7 and 8.

Referring to FIG. 10, an LCD according to the exemplary embodiment is similar to the aforementioned exemplary embodiment illustrated in FIG. 7, but gate drivers 400a and 400b may be disposed at edges of both upper and lower sides or at one edge of one side of a liquid crystal panel assembly 300, respectively, and a data driver 500 may be disposed at an edge of a left side or a right side, or edges of both sides of the liquid crystal panel assembly 300.

The gate drivers 400a and 400b may be integrated on the liquid crystal panel assembly 300 as illustrated in FIG. 10, and may be directly mounted on the liquid crystal panel assembly 300 in a form of at least one IC chip, may be mounted on a flexible printed circuit film and attached to the liquid crystal panel assembly 300 in a form of a TCP, or may be mounted on a separate PCB, as illustrated in FIG. 11.

Now, an LCD according to an exemplary embodiment of the invention will be described with reference to FIG. 12.

Figure 12:
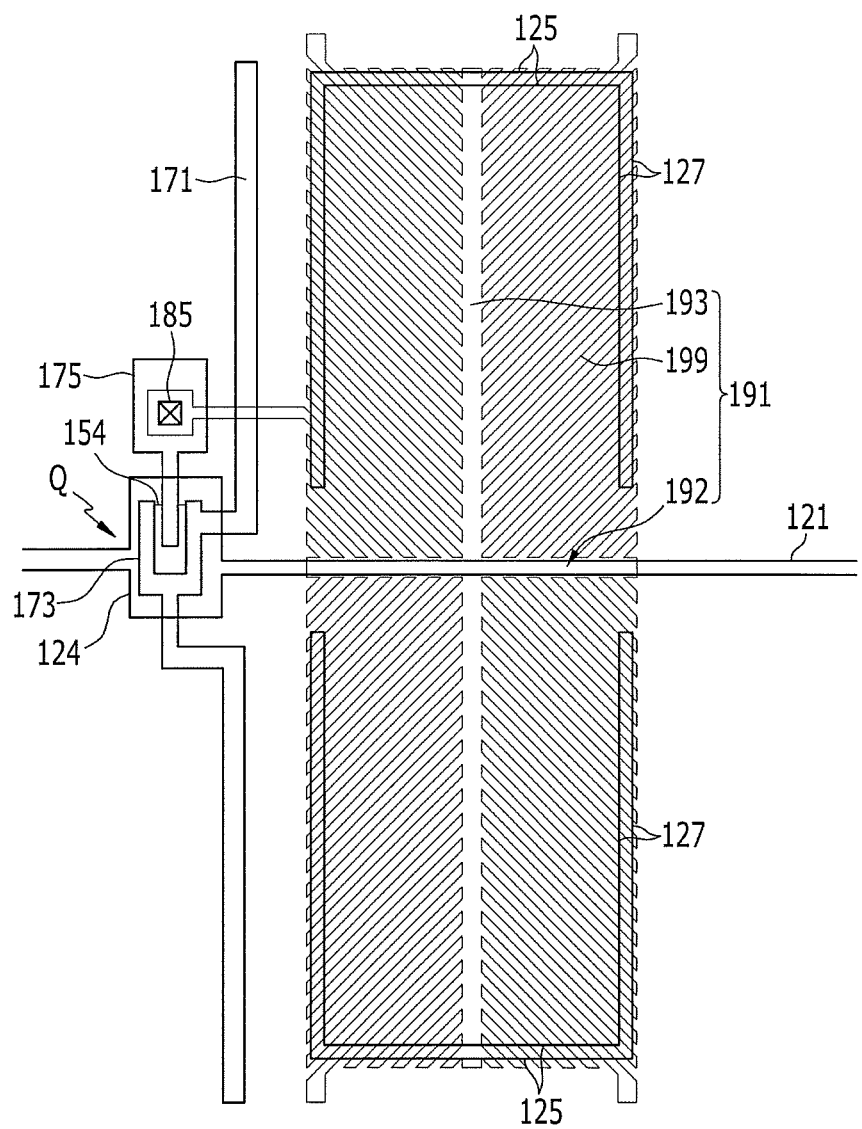
FIGS. 12 and 13 are plan views of exemplary embodiments of one pixel of an LCD according to the invention, respectively.

FIG. 12 is a plan view of one pixel of the LCD according to the exemplary embodiment of the invention.

Referring to FIG. 12, the LCD according to the exemplary embodiment is similar to that of the aforementioned exemplary embodiments illustrated in FIGS. 2 to 6, but a length of one pixel PX and a pixel electrode 191 in a vertical direction may be longer than a length thereof in a horizontal direction.

According to the exemplary embodiment, a length of a horizontal stem portion 192 of the pixel electrode 191 may be smaller than a length of a vertical stem portion 193. The gate line 121 overlaps the horizontal stem portion 192 like the aforementioned exemplary embodiment.

A storage electrode line 125 may include a portion overlapping an upper portion of the pixel electrode 191 and a portion overlapping a lower portion of the pixel electrode 191 based on the gate line 121.

Next, an LCD according to an exemplary embodiment of the invention will be described with reference to FIG. 13.

Figure 13:
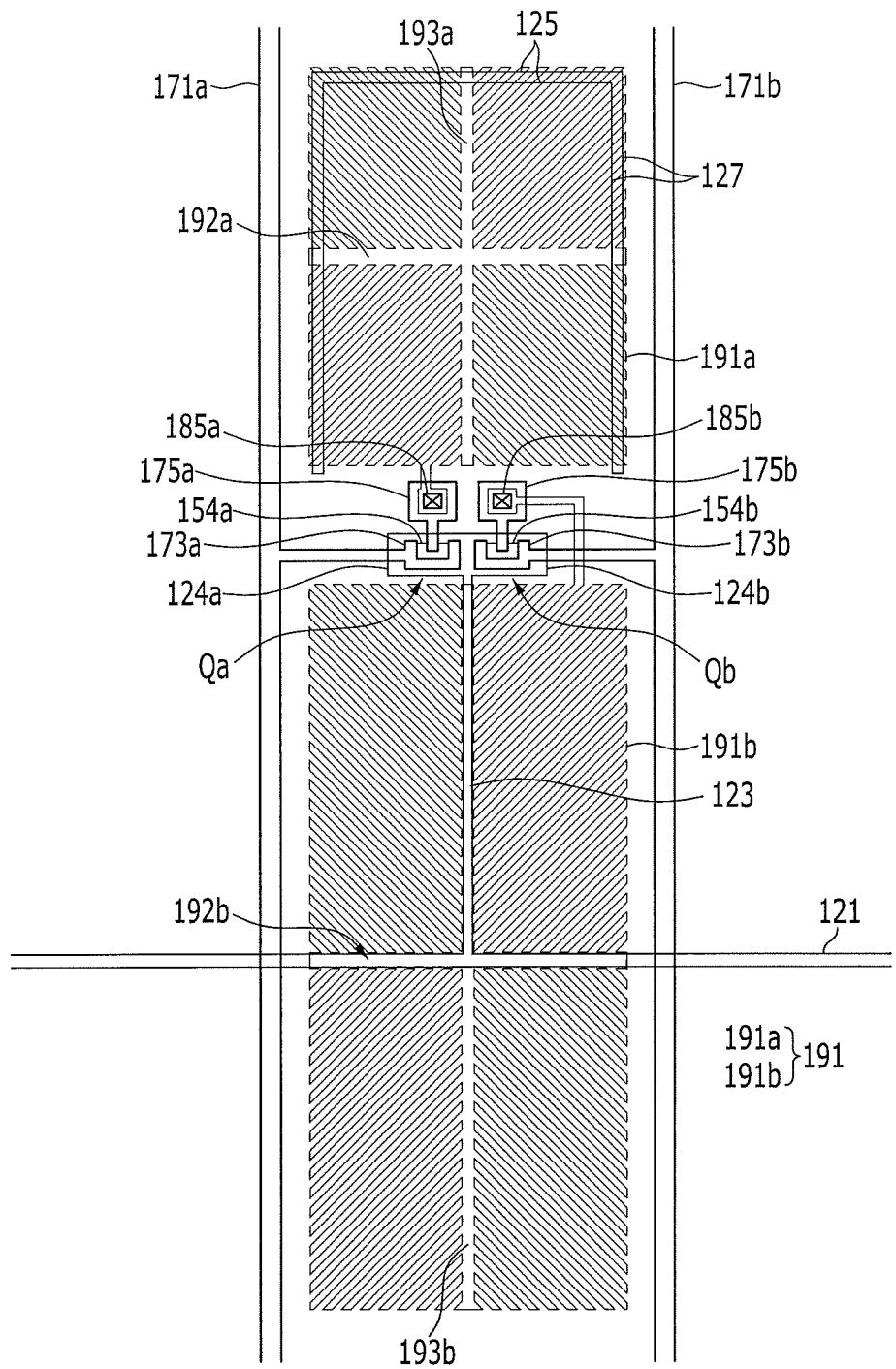

FIG. 13 is a plan view of one pixel of the LCD according to the exemplary embodiment of the invention One pixel PX of the LCD according to the exemplary embodiment of the invention may include at least two sub-pixels. Different sub-pixels of one pixel PX may display an image according to different gamma curved lines or display an image according to the same gamma curved line for one input image signal. That is, the different sub-pixels of one pixel PX may display images with different luminance in order to improve side visibility for one input image signal.

A gate line 121 and a storage electrode line 125 are disposed on an insulating substrate 110 (refer to FIG. 3) of a lower display panel.

The gate line 121 is extended in a substantially horizontal direction, and includes a first gate electrode 124a and a second gate electrode 124b. The gate line 121 may further include a connecting portion 123 connecting a main line extended in a horizontal direction and the first and second gate electrodes 124a and 124b. The connecting portion 123 may be extended in the substantially vertical direction.

The storage electrode line 125 may include the main line extended in the substantially horizontal direction, and a plurality of branch portions 127 extended to be substantially vertical to the main line.

A gate insulating layer 140 (refer to FIG. 3) is disposed on the gate line 121 and the storage electrode line 125, and a first semiconductor 154a and a second semiconductor 154b are disposed on the gate insulating layer 140. The first semiconductor 154a and the second semiconductor 154b may be connected with each other.

A first data line 171a, a second data line 171b, a first drain electrode 175a and a second drain electrode 175b are disposed on the first and second semiconductor 154a and 154b and the gate insulating layer 140.

The first and second data lines 171a and 171b are extended in the substantially vertical direction, and may be parallel to each other. The first and the second data lines 171a and 171b includes a first source electrode 173a and a second source electrode 173b extended toward the first gate electrode 124a and the second gate electrode 124b.

The first drain electrode 175a and the second drain electrode 175b may include end portions facing the first source electrode 173a and the second source electrode 173b, respectively.

The first and second gate electrodes 124a and 124b, the first and second source electrodes 173a and 173b, and the first and second drain electrodes 175a and 175b constitute first and second TFTs Qa and Qb together with the first and second semiconductors 154a and 154b.

A passivation layer 180 (refer to FIG. 3) is disposed on the first and second TFTs Qa and Qb. Contact holes 185a and 185b, through which the first and second drain electrodes 175a and 175b are exposed, respectively, are defined in the passivation layer 180.

A pixel electrode 191 is disposed on the passivation layer 180 (refer to FIG. 3). The pixel electrode 191 includes a first sub-pixel electrode 191a and a second sub-pixel electrode 191b. Each of the first sub-pixel electrode 191a and the second sub-pixel electrode 191b may have the same structure as that of the pixel electrodes 191 according to the previously described several exemplary embodiments. That is, the first sub-pixel electrode 191a may include a horizontal stem portion 192a and a vertical stem portion 193a, and the second sub-pixel electrode 191b may include a horizontal stem portion 192b and a vertical stem portion 193b.

The first sub-pixel electrode 191a and the second sub-pixel electrode 191b may be disposed above and under the gate line 121 with the gate line 121 interposed therebetween, respectively. In an exemplary embodiment, an area of the first sub-pixel electrode 191a may be smaller than an area of the second sub-pixel electrode 191b.

The first sub-pixel electrode 191a may receive a data voltage from the first drain electrode 175a through the contact hole 185a, and the second sub-pixel electrode 191b may receive a data voltage from the second drain electrode 175b through the contact hole 185b.

According to the exemplary embodiment, the gate line 121 overlaps the horizontal stem portion 192b of the second sub-pixel electrode 191b. In this case, the connecting portion 123 of the gate line 121 may overlap the vertical stem portion 193b of the second sub-pixel electrode 191b. However, differently from FIG. 13, the gate line 121 may overlap the horizontal stem portion 192b of the first sub-pixel electrode 191a, and the connecting portion 123 of the gate line 121 may overlap the vertical stem portion 193b of the first sub-pixel electrode 191a. An effect by the above described alignment is the same as that of the aforementioned exemplary embodiment, thereby a detailed description will be omitted.

In addition, some characteristics of the aforementioned exemplary embodiments may be applied to the exemplary embodiment.

Next, an LCD according to an exemplary embodiment of the invention will be described with reference to FIGS. 14 to 18.

Figure 14:
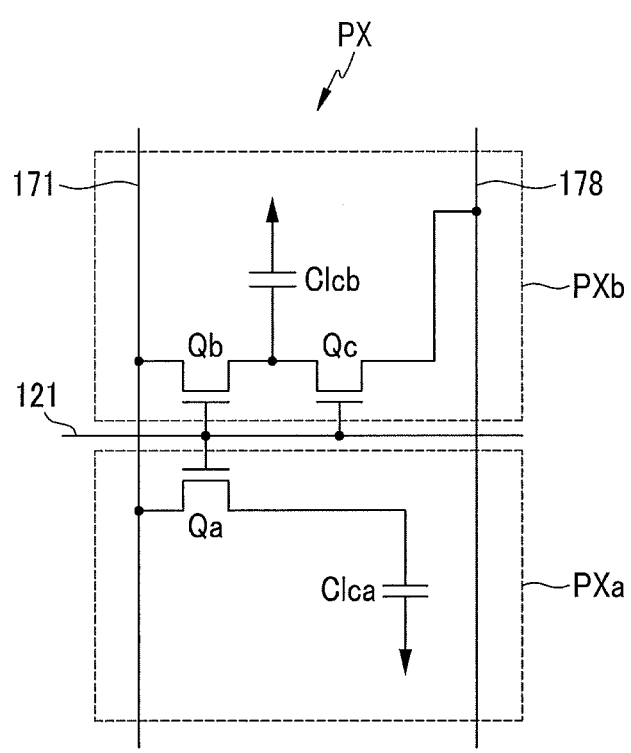
FIG. 14 is an equivalent circuit diagram of an exemplary embodiment of one pixel of an LCD according to the invention.

FIG. 14 is an equivalent circuit diagram of one pixel of an LCD according to an exemplary embodiment of the invention.

Referring to FIG. 14, the LCD according to the exemplary embodiment of the invention includes signal lines such as a gate line 121, a data line 171 and a reference voltage line 178 transmitting a reference voltage and a pixel PX connected to the signal lines.

Each pixel PX includes first and second sub-pixels PXa and PXb. The first subpixel PXa includes a first switching element Qa and a first liquid crystal capacitor Clca, and the second subpixel PXa includes second and third switching elements Qb and Qc, and a second liquid crystal capacitor Clcb. Each of the first switching element Qa and the second switching element Qb are connected to the gate line 121 and the data line 171, and the third switching element Qc is connected to an output terminal of the second switching element Qb and the reference voltage line 178. An output terminal of the first switching element Qa is connected to the first liquid crystal capacitor Clca, and the output terminal of the second switching element Qb is connected to the second liquid crystal capacitor Clcb and an input terminal of the third switching element Qc. A control terminal of the third switching element Qc is connected with the gate line 121, an input terminal thereof is connected to the second liquid crystal capacitor Clcb, and the output terminal thereof is connected to the reference voltage line 178.

An operation of the pixel PX illustrated in FIG. 14 will be described. First, when a gate on voltage is applied to the gate line 121, the first switching element Qa, the second switching element Qb, and the third switching element Qc connected to the gate line 121 are turned on. Accordingly, the data voltage applied to the data line 171 is applied to the first liquid crystal capacitor Clca and the second liquid crystal capacitor Clcb through the turned-on first switching element Qa and the second switching element Qb, respectively, so that the first liquid crystal capacitor Clca and the second liquid crystal capacitor Clcb are charged by a difference between the data voltage and a common voltage. In this case, the same data voltage is transmitted to the first liquid crystal capacitor Clca and the second liquid crystal capacitor Clcb through the first and second switching elements Qa and Qb, but a charged voltage of the second liquid crystal capacitor Clcb is divided through the third switching element Qc. Accordingly, the charged voltage of the second liquid crystal capacitor Clcb is smaller than the charged voltage of the first liquid crystal capacitor Clca so that luminance of the two sub-pixels PXa and PXb may be different. Accordingly, an image viewed from a side may be maximally similar to an image viewed from a front side by appropriately adjusting the charged voltage of the first liquid crystal capacitor Clca and the charged voltage of the second liquid crystal capacitor Clcb, thereby improving side visibility.

However, the structure of the pixel PX of the LCD according to the exemplary embodiment of the invention is not limited to the exemplary embodiment illustrated in FIG. 14, and may be various.

FIGS. 15 to 18 are plan views of one pixel of an LCD according to an exemplary embodiment of the invention, respectively.

FIGS. 15 to 18 illustrate exemplary embodiments having the same circuit structure as that of the aforementioned circuit illustrated in FIG. 14, but the invention is not limited thereto.

First, a lower display panel will be described with reference to FIG. 15. A plurality of gate lines 121 is disposed on an insulating substrate.

A gate line 121 is extended in a substantially horizontal direction, and includes a first gate electrode 124a, a second gate electrode 124b and a third gate electrode 124c. The gate line 121 includes a bent portion 129 periodically bent from a main line extended in the substantially horizontal direction.

A gate insulating layer 140 is disposed on the gate line 121, and a first semiconductor 154a, a second semiconductor 154b, and a third semiconductor 154c are disposed on the gate insulating layer 140.

A data conductor including a data line 171, a first drain electrode 175a, a second drain electrode 175b, a third source electrode 173c, and a third drain electrode 175c, and a reference voltage line 178 is disposed on the first semiconductor 154a, the second semiconductor 154b and the third semiconductor 154c.

The data line 171 is extended in a substantially vertical direction, and includes a first source electrode 173a and a second source electrode 173b, which are extended toward the first and second gate electrodes 124a and 124b, respectively.

The reference voltage line 178 may include a main line 178a generally parallel to the data line 171, and a branch portion 178b extended from the main line 178a to be generally parallel to the gate line 121. One end of the branch portion 178b provides the third drain electrode 175c.

The first drain electrode 175a faces the first source electrode 173a, the second drain electrode 175b faces the second source electrode 173b, and the third drain electrode 175c faces the third source electrode 173c. The third source electrode 173c is connected with the second drain electrode 175b.

The first gate electrode 124a, the first source electrode 173a and the first drain electrode 175a constitute a first TFT Qa together with the first semiconductor 154a, the second gate electrode 124b, the second source electrode 173b and the second drain electrode 175b constitute a second TFT Qb together with the second semiconductor 154b, and the third gate electrode 124c, the third source electrode 173c and the third drain electrode 175c constitute a third TFT Qc together with the third semiconductor 154c.

A passivation layer is disposed on the data conductor, and a pixel electrode 191 is disposed on the passivation layer.

One pixel electrode 191 includes a first sub-pixel electrode 191a and a second sub-pixel electrode 191b, and an entire shape of the pixel electrode 191 may be a quadrangle.

The first sub-pixel electrode 191a may be surrounded by the second sub-pixel electrode 191b with a gap 92 defined therebetween.

The first sub-pixel electrode 191a includes a pair of oblique portions obliquely extended with respect to the gate line 121. The pair of oblique portions may meet at a center portion of the pixel PX.

The second sub-pixel electrode 191b includes a triangular portion disposed under the pair of oblique portions of the first sub-pixel electrode 191a, and portions disposed at a side or an upper side of each of the pair of oblique portions of the first sub-pixel electrode 191a. A plurality of cutouts 93 may be defined in the second sub-pixel electrode 191b. A hypotenuse of the cutout 93 may be extended to be substantially parallel to a hypotenuse of the gap 92. The hypotenuse of the gap 92 and the hypotenuse of the cutout 93 may have an angle of approximately 45 degrees or approximately 135 degrees with respect to the gate line 121. The pixel electrode 191 may be divided into approximately four sub-regions by the gap 92 and the cutout 93.

An area of the second sub-pixel electrode 191b may be larger than an area of the first sub-pixel electrode 191a.

The first sub-pixel electrode 191a receives a data voltage from the first drain electrode 175a through a first contact hole 185a, and the second sub-pixel electrode 191b receives a data voltage from the second drain electrode 175b through a second contact hole 185b. In this case, a part of the data voltage applied to the second drain electrode 175b is divided through the third source electrode 173c, so that a magnitude of the voltage applied to the second sub-pixel electrode 191b may be smaller than a magnitude of the voltage applied to the first sub-pixel electrode 191a.

Next, an upper display panel 200 will be described. An opposing electrode (not illustrated) facing the pixel electrode 191 and receiving a common voltage is disposed on the insulating substrate. A plurality pair of cutouts 71 having oblique portions substantially parallel to the hypotenuse of the gap 92 and the hypotenuse of the cutout 93 of the pixel electrode 191 may be defined in the opposing electrode. Each cutout 71 may be defined between an edge side of the adjacent pixel electrode 191, and the cutout 93 and the gap 92 of the pixel electrode 191.

A liquid crystal layer interposed between the lower display panel and the upper display panel includes liquid crystal molecules having negative dielectric anisotropy. The liquid crystal molecules may be aligned so that longer axes thereof are generally vertical to surfaces of the two display panels in a state where an electric field is not present.

The first sub-pixel electrode 191a provides a first liquid crystal capacitor Clca together with the opposing electrode of the upper display panel and the liquid crystal layer interposed therebetween, and the second sub-pixel electrode 191b provides a second liquid crystal capacitor Clcb together with the opposing electrode and the liquid crystal layer interposed therebetween.

The first and second sub-pixel electrodes 191a and 191b to which the data voltage is applied generate an electric field on the liquid crystal layer together with the opposing electrode of the upper display panel, thereby determining a direction of the liquid crystal molecules of the liquid crystal layer between the two electrodes. The inclination direction of the liquid crystal molecules may be primary determined by a horizontal component created by distorting a main electric field in which the sides of the gap 92 and the cutout 93 of the pixel electrode 191 and the cutout 71 of the opposing electrode are substantially vertical to the surfaces of the display panels. The horizontal component of the main electric field is substantially vertical to the sides of the gap 92 and the cutouts 71 and 93, and the liquid crystal molecules incline in a direction substantially vertical to the sides of the gap 92 and the cutouts 71 and 93.

According to the exemplary embodiment, the bent portion 129 of the gate line 121 may be extended along portions in which the electrode of the pixel electrode 191 is removed, for example, the gap 92 or the cutout 93, and overlap the gap 92 or the cutout 93. FIG. 15 illustrates an exemplary embodiment in which the bent portion 129 of the gate line 121 extends substantially parallel to and overlapping the gap 92 of the pixel electrode 191.

According to the exemplary embodiment of the invention, the gap 92 or the cutout 93 of the pixel electrode 191 provides a border between the sub-regions of the pixel electrode 191, and is a non-transmission region through which light is hardly transmitted. Accordingly, even though the gate off voltage is applied to the gate line 121 overlapping the gap 92 or the cutout 93 of the pixel electrode 191, light leakage due to the liquid crystal molecules inclined by the electric field by the gate off voltage is covered by the non-transmission region or does not influence an image displayed by the pixel PX. Further, differently from the related art, according to the exemplary embodiment of the invention, the gate line 121 is not disposed between the adjacent pixels PX, thereby light leakage by the gate off voltage is not generated at the edge of the pixel PX. Accordingly, it is possible to decrease a non-opening region between the adjacent pixels PX, thereby further increasing an aperture ratio of one pixel PX and improving transmittance.

Further, the region corresponding to the gap 92 or the cutout 93 of the pixel electrode 191 is a boundary between the sub-regions of the pixel electrode 191 and is not a main transmission region of light, thereby the aperture ratio and transmittance of the pixel PX are not decreased.

Figure 15:
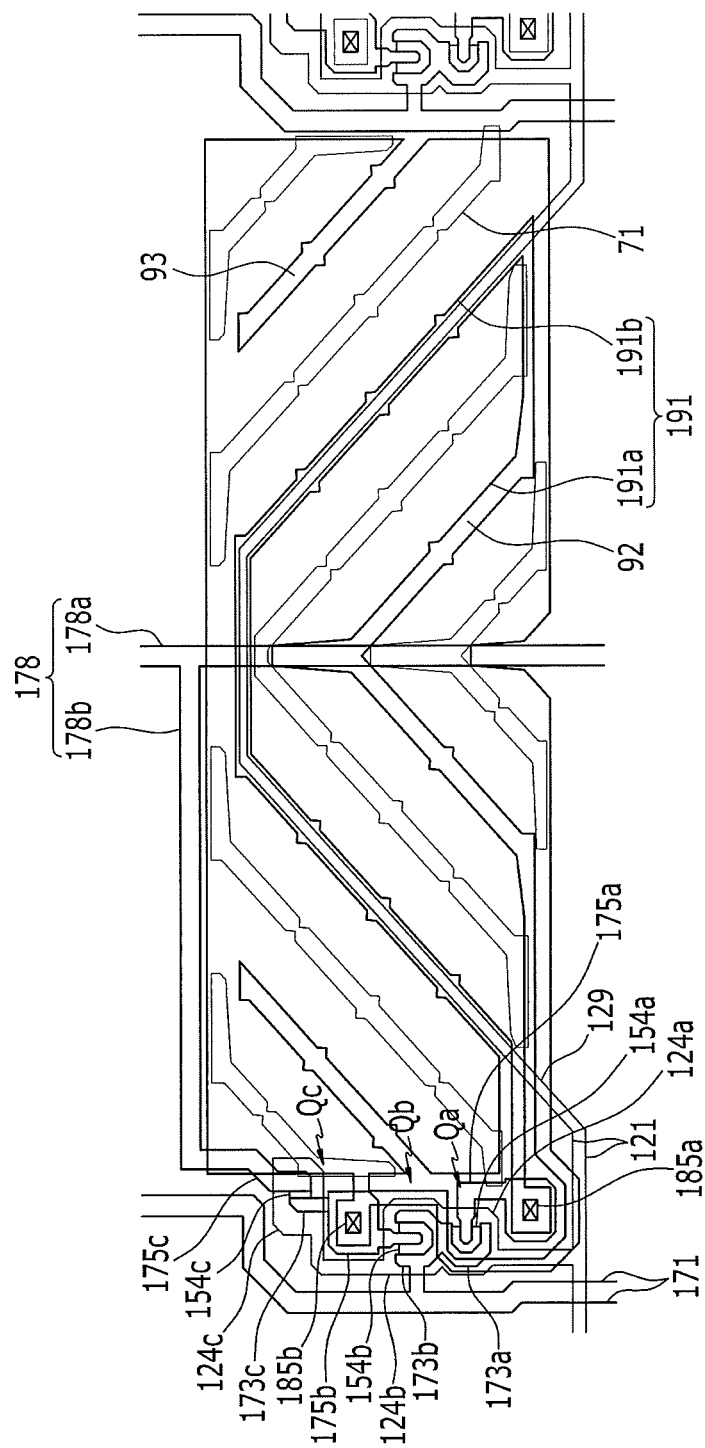
FIGS. 15 to 18 are plan views of exemplary embodiments of one pixel of an LCD according to the invention, respectively.
Figure 16:
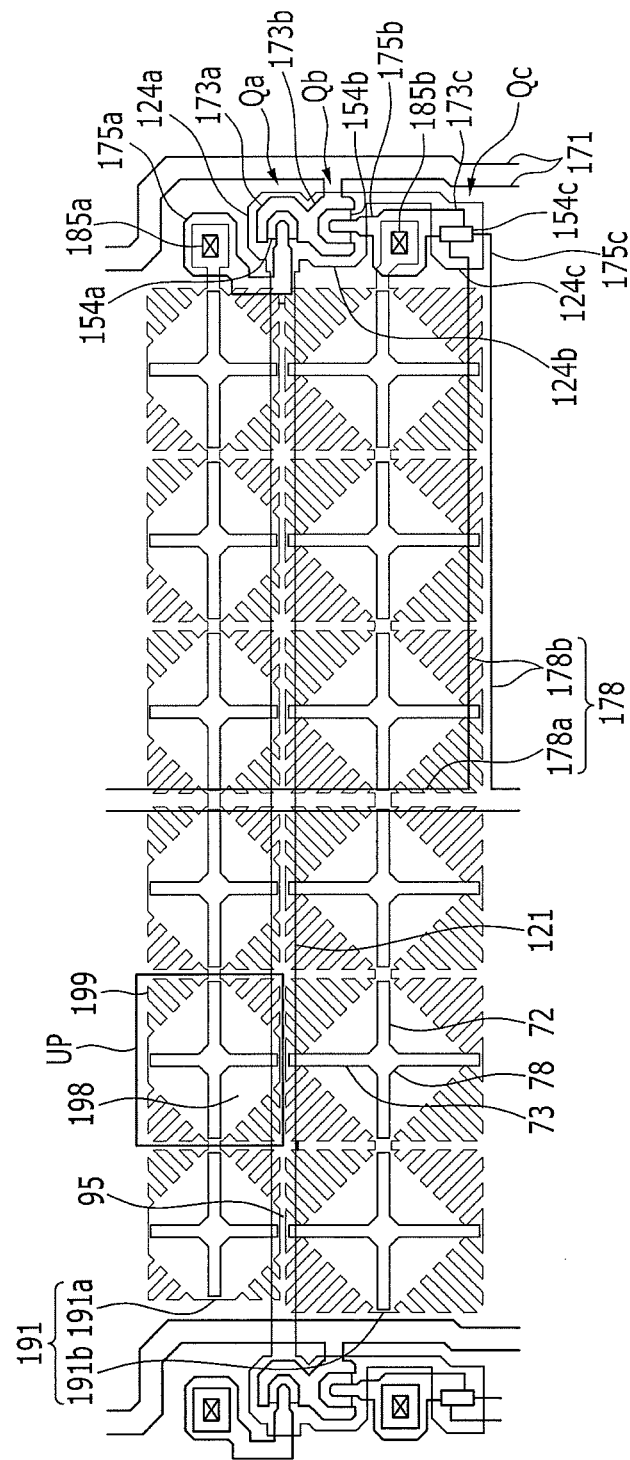

Next, referring to FIG. 16, an LCD according to the exemplary embodiment is similar to that of the exemplary embodiment illustrated in FIG. 15, but structures of a pixel electrode 191 and a gate line 121 may be different.

The gate line 121 is extended in a substantially horizontal direction even at an opening of the pixel PX.

The pixel electrode 191 includes a first sub-pixel electrode 191a and a second sub-pixel electrode 191b. The first sub-pixel electrode 191a and the second sub-pixel electrode 191b may be adjacent to each other in a vertical direction with a gap 95 defined therebetween, and each of the first sub-pixel electrode 191a and the second sub-pixel electrode 191b may be extended in a horizontal direction.

Each of the first sub-pixel electrode 191a and the second sub-pixel electrode 191b may include a plurality of unit electrodes UP disposed in a line in the horizontal direction and connected with each other. FIG. 16 illustrates an exemplary embodiment in which each of the first sub-pixel electrode 191a and the second sub-pixel electrode 191b includes six unit electrodes UP.

An entire shape of the unit electrode UP is a quadrangle, and may include a center electrode 198 disposed at a center and a plurality of minute branches 199 extending to the outside from a side of the center electrode 198. However, the unit electrode UP is not limited thereto, and the unit electrode UP may include a horizontal branch portion (not illustrated) and a vertical branch portion (not illustrated) extended to be vertical to each other, and in this case, the center electrode 198 may be disposed at a portion at which the horizontal branch portion and the vertical branch portion cross each other.

In an exemplary embodiment, the center electrode 198 may be shaped like a polygon, for example, a rhombus, including four straight sides disposed at four sub-regions of the unit electrode UP, respectively. In this case, each side of the center electrode 198 may have an angle of approximately 45 degrees or approximately 135 degrees with respect to a direction in which the gate line 121 is extended. A liquid crystal control is enhanced through a fringe field by the edge side of the center electrode 198, so that it is possible to further improve transmittance of the LCD.

An opposing electrode disposed on an upper display panel includes a cross-shaped opening including a horizontal opening 72 corresponding to each unit electrode UP, and a vertical opening 73 crossing the horizontal opening 72. The unit electrode UP may be divided into four sub-regions by the cross-shaped opening of the opposed electrode. The opposing electrode may further include a center opening 78 disposed at a center portion of the cross-shaped opening. In an exemplary embodiment, the center opening 78 may be shaped like a polygon, for example, a rhombus, including four straight sides, which are disposed at the four sub-regions, respectively.

According to the exemplary embodiment, the gate line 121 is extended along a gap 95 between the first sub-pixel electrode 191a and the second sub-pixel electrode 191b, and may overlap the gap 95. The gap 95 of the pixel electrode 191 is a boundary between the sub-regions of the pixel electrode 191 and is a non-transmission region in which light is hardly transmitted. Accordingly, even though a gate off voltage is applied to the gate line 121, light leakage by the liquid crystal molecules inclined by the electric field by the gate off voltage is covered by the non-transmission region or does not influence an image displayed by the pixel PX. Further, differently from the related art, according to the exemplary embodiment of the invention, the gate line 121 is not disposed between the adjacent pixels PX, so that light leakage by the gate off voltage is not generated at the edge of the pixel PX. Therefore, it is possible to decrease a non-opening region between the adjacent pixels PX, thereby further increasing an aperture ratio of one pixel PX and improving transmittance.

Further, the region corresponding to the gap 95 of the pixel electrode 191 is not a main transmission region of light, so that the aperture ratio and transmittance of the pixel PX are not decreased.

Figure 17:
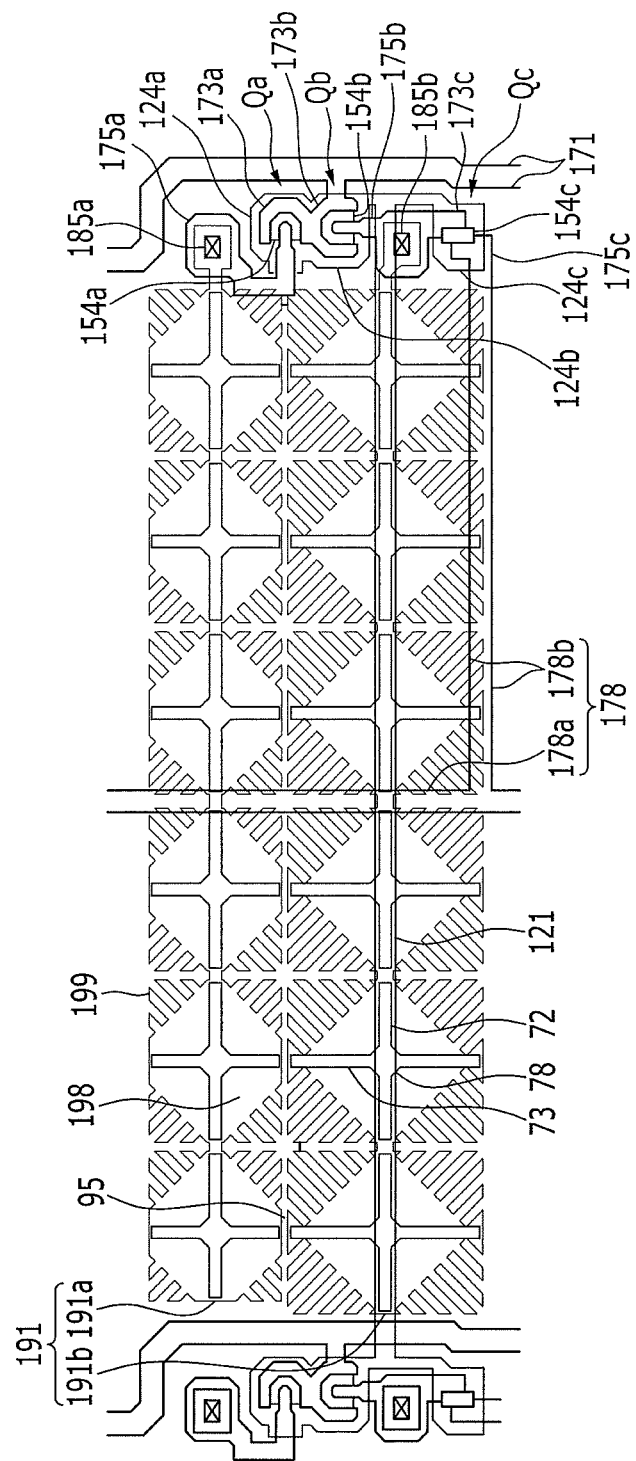

Next, referring to FIG. 17, an LCD according to the exemplary embodiment is similar to that of the exemplary embodiment illustrated in FIG. 16, but a gate line 121 may overlap a horizontal opening 72 of an opposing electrode facing a first sub-pixel electrode 191a or a second sub-pixel electrode 191b while being extended along the horizontal opening 72. FIG. 17 illustrates an exemplary embodiment in which the gate line 121 overlaps the horizontal opening 72 of the opposing electrode facing the second sub-pixel electrode 191b having a relatively larger area while being extended along the horizontal opening 72.

The horizontal opening 72 of the opposing electrode is also a boundary between sub-regions and is a non-transmission region in which light is hardly transmitted. Accordingly, even though a gate off voltage is applied to the gate line 121, light leakage by the liquid crystal molecules inclined by the electric field by the gate off voltage is covered by the non-transmission region or does not influence an image displayed by the pixel PX. Other effects are the same as those of the aforementioned exemplary embodiments.

Figure 18:
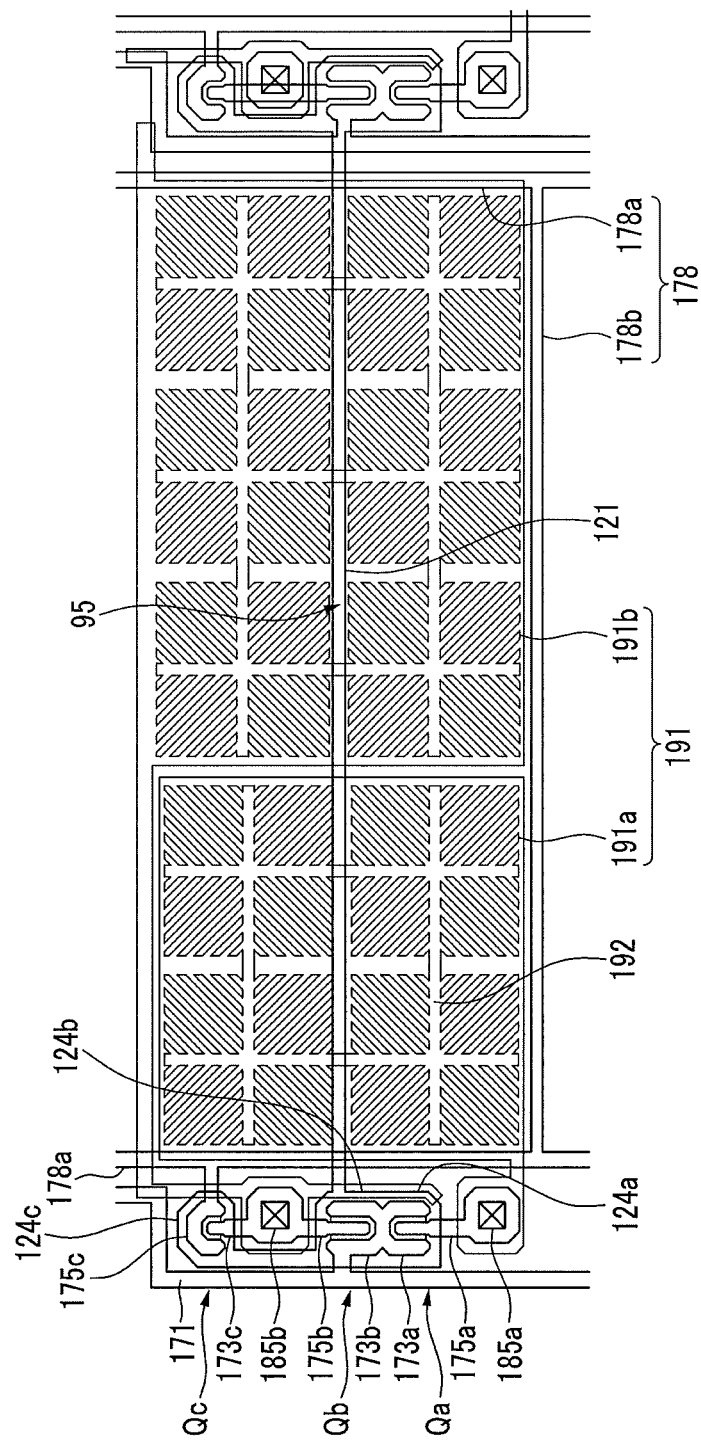

Lastly, referring to FIG. 18, an LCD according to the exemplary embodiment is similar to that of the exemplary embodiment illustrated in FIG. 16, but structures of a gate line 121 and a pixel electrode 191 may be different.

According to the exemplary embodiment, a first sub-pixel electrode 191a and a second sub-pixel electrode 191b are adjacent in a horizontal direction, and each of the first sub-pixel electrode 191a and the second sub-pixel electrode 191b may include a plurality of unit electrodes UP. In this case, in a case where an area of the second sub-pixel electrode 191b and an area of the first sub-pixel electrode 191a are different in order to improve side visibility, a number of unit electrodes UP included in the first sub-pixel electrode 191a may be smaller than a number of unit electrodes UP included in the second sub-pixel electrode 191b. FIG. 18 illustrates an exemplary embodiment in which the first sub-pixel electrode 191a includes the four unit electrodes UP, and the second sub-pixel electrode 191b includes the six unit electrodes UP.

The unit electrode UP according to the exemplary embodiment may have a different structure from that of the unit electrode UP of the aforementioned exemplary embodiment. In an exemplary embodiment, the unit electrode UP may have the similar structure to that of the aforementioned pixel electrode 191 illustrated in FIG. 1. The unit electrode UP may be shaped similar to a square, for example.

According to the exemplary embodiment, the gate line 121 may be extended in a horizontal direction along a boundary between the adjacent unit electrodes UP. However, in another exemplary embodiment, the gate line 121 may also be extended in a horizontal direction along a plurality of horizontal branch portions 192 aligned in the horizontal direction.

The boundary between the unit electrodes UP is also a boundary between sub-regions and is a non-transmission region in which light is hardly transmitted, so that even though a gate off voltage is applied to the gate line 121, light leakage by the liquid crystal molecules inclined by the electric field by the gate off voltage is covered by the non-transmission region or does not influence an image displayed by the pixel PX. Further, in a case where the gate line 121 overlaps the horizontal stem portion 192 of the pixel electrode 191, an electric field by the gate off voltage may be fundamentally blocked by the horizontal stem portion 192 of the pixel electrode 191. Other effects are the same as those of the aforementioned exemplary embodiment.

In the exemplary embodiment, in which it is illustrated that the length of the pixel electrode 191 of one pixel PX in the horizontal direction is longer than the length of the pixel electrode 191 in the vertical direction, among the aforementioned exemplary embodiments, the length of the pixel electrode 191 in the horizontal direction may also be smaller than the length of the pixel electrode 191 in the vertical direction.

While this invention has been described in connection with what is presently considered to be practical exemplary embodiments, it is to be understood that the invention is not limited to the disclosed exemplary embodiments, but, on the contrary, is intended to cover various modifications and equivalent arrangements included within the spirit and scope of the appended claims.

What is claimed is:

1. A liquid crystal display, comprising:
a plurality of pixels;
a lower substrate and an upper substrate facing each other;
a liquid crystal layer disposed between the lower substrate and the upper substrate; and a pixel electrode which is disposed on the lower substrate and includes a first sub-pixel electrode and a second sub-pixel electrode that are adjacent to each other and completely separated from each other with a gap defined between the first sub-pixel electrode and the second sub-pixel electrode and extending in a first direction, and
a gate line which is disposed on the lower substrate and includes a portion which extends in the first direction
wherein
each of the first sub-pixel electrode and the second sub-pixel electrode includes only one row of a plurality of unit electrodes which are arranged in the first direction and each adjacent unit electrodes directly contact to each other in each of the first sub-pixel electrode and the second sub-pixel electrode, each of the plurality of unit electrodes including a plurality of sub-regions which differently controls an inclination direction of liquid crystal molecules included in the liquid crystal layer,
the gap defines a boundary between the only one row of the plurality of unit electrodes of the first sub-pixel electrode and the only one row of the plurality of unit electrodes of the second sub-pixel electrode,
the gate line overlaps and extends along the gap, and
a width of the gate line overlapping the gap in a second direction perpendicular to the first direction is greater than a minimum width of the gap in the second direction.

2. The liquid crystal display of claim 1, wherein the pixel electrode includes:
a first stem portion providing a boundary between adjacent sub-regions of the plurality of sub-regions, and extending along the first direction;
a second stem portion substantially vertically connected to the first stem portion; and
a plurality of minute branches extending in different directions in different sub-regions, respectively.

3. The liquid crystal display of claim 2, further comprising:
a data line configured to transmit a data voltage, a thin film transistor configured to apply the data voltage to the pixel electrode, and a storage electrode line configured to transmit a common voltage,
wherein
the thin film transistor includes a gate electrode connected with the gate line, and a source electrode and a drain electrode facing each other with respect to the gate electrode, and
the storage electrode line includes a portion which overlaps at least one of the pixel electrode and the drain electrode.

4. The liquid crystal display of claim 3, wherein:
the thin film transistor is disposed between two pixels of the plurality of pixels which neighbor each other in the first direction.

5. The liquid crystal display of claim 2, further comprising:
an opposing electrode disposed on the upper substrate,
wherein an opening is defined in the opposing electrode, and the opening faces and extends substantially parallel to at least one of the first stem portion and the second stem portion.

6. The liquid crystal display of claim 2, wherein:
a length of the first stem portion is longer than a length of the second stem portion.

7. The liquid crystal display of claim 2, wherein:
a length of the second stem portion is longer than a length of the first stem portion.

8. The liquid crystal display of claim 1, wherein:
a unit electrode of the plurality of unit electrodes includes a plurality of minute branches extending in different direction in different sub-regions, respectively.

9. The liquid crystal display of claim 1, wherein:
a first cutout providing a boundary between the plurality of sub-regions is defined in the pixel electrode.

10. The liquid crystal display of claim 9, further comprising:
an opposing electrode disposed on the upper substrate, and
a second cutout is defined in the opposing electrode, extends substantially parallel to the first cutout and provides a boundary between the plurality of sub-regions.

11. The liquid crystal display of claim 1, further comprising:
a data line configured to transmit a data voltage, a thin film transistor configured to apply the data voltage to the pixel electrode, and a storage electrode line configured to transmit a common voltage,
wherein
the thin film transistor includes a gate electrode connected with the gate line, and a source electrode and a drain electrode facing each other with respect to the gate electrode, and
the storage electrode line includes a portion which overlaps at least one of the pixel electrode and the drain electrode.

12. The liquid crystal display of claim 1, further comprising:
a data line configured to transmit a data voltage, and a thin film transistor configured to apply the data voltage to the pixel electrode,
wherein
the thin film transistor is disposed between adjacent pixels of the plurality of pixels.

13. The liquid crystal display of claim 1, further comprising:
a vertical alignment layer disposed on an inner surface of at least one of the lower substrate and the upper substrate.

* * * * *